US009359033B2

(12) United States Patent
Okawada et al.

(10) Patent No.: US 9,359,033 B2
(45) Date of Patent: Jun. 7, 2016

(54) FUEL TANK FOR VEHICLE

(75) Inventors: Takayuki Okawada, Saitama (JP); Yasno Hanafusa, Saitama (JP); Kou Kurata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 13/070,281

(22) Filed: Mar. 23, 2011

(65) Prior Publication Data

US 2011/0233207 A1 Sep. 29, 2011

(30) Foreign Application Priority Data

Mar. 26, 2010 (JP) .................... 2010-072284
Dec. 1, 2010 (JP) .................... 2010-268706

(51) Int. Cl.
*B65D 47/02* (2006.01)
*B62J 35/00* (2006.01)
*B60K 15/03* (2006.01)
*B60K 15/04* (2006.01)

(52) U.S. Cl.
CPC ............... *B62J 35/00* (2013.01); *B60K 15/03* (2013.01); *B60K 15/04* (2013.01); *B60K 15/0403* (2013.01); *B60K 2015/03453* (2013.01); *B60K 2015/03473* (2013.01); *B60K 2015/0461* (2013.01); *B60Y 2200/126* (2013.01); *B62K 2202/00* (2013.01)

(58) Field of Classification Search
USPC ............. 220/212, 88.2, 86.3, 86.1, 88.1
See application file for complete search history.

(56) References Cited

U.S. PATENT DOCUMENTS

| 1,663,947 | A | * | 3/1928 | Kessler | 220/88.2 |
| 1,875,908 | A | * | 9/1932 | Zarobsky | 220/88.2 |
| 2,379,735 | A | * | 7/1945 | Meikle | 220/88.2 |
| 4,345,694 | A | * | 8/1982 | Chambers | 220/86.3 |
| 5,431,199 | A | * | 7/1995 | Benjay et al. | 141/59 |
| 5,595,222 | A | * | 1/1997 | Thompson | 141/312 |
| 7,147,001 | B2 | * | 12/2006 | Gamble | 137/527.4 |
| 7,458,391 | B2 | * | 12/2008 | Krishnamoorthy et al. | 137/527.4 |
| 2006/0070667 | A1 | * | 4/2006 | Gaynor et al. | 137/592 |
| 2008/0257426 | A1 | * | 10/2008 | Spink et al. | 137/527 |
| 2010/0288763 | A1 | | 11/2010 | Muto et al. | |

FOREIGN PATENT DOCUMENTS

JP 2009-101854 A 5/2009

* cited by examiner

*Primary Examiner* — Jeffrey Allen
(74) *Attorney, Agent, or Firm* — Birch, Stewart, Kolasch & Birch, LLP

(57) ABSTRACT

In a fuel tank for a vehicle in which a lower opening part of a fuel supply guide tube is covered with a flame arrester, to enable a fuel to be extracted via a fuel supply port. In the fuel tank for a vehicle provided with a fuel supply port device, the fuel supply port device includes an insertion hole through which the inside of the fuel supply port device and the inside of a tank body communicate with each other and through which a tool for extracting the fuel is inserted, and an open-close lid for opening and closing the insertion hole.

17 Claims, 14 Drawing Sheets

FUEL TANK FOR VEHICLE

CROSS-REFERENCE TO RELATED APPLICATIONS

This application claims priority under 35 U.S.C. §119(a) to Application Nos. 2010-072284 and 2010-268706, filed in Japan on Mar. 26, 2010 and Dec. 1, 2010. The entirety of each of the above-identified applications is expressly incorporated herein by reference.

BACKGROUND OF THE INVENTION

1. Field of the Invention

The present invention relates to a fuel tank, which is used in a saddle ride type vehicle such as a motorcycle.

2. Description of Background Art

Conventionally, a fuel tank for a motorcycle in which an ethanol fuel is used as an engine fuel, is known to include a fuel supply port provided at an upper wall of a tank body, a fuel supply guide tube extending from the fuel supply port into the tank body, and a flame arrester covering a lower opening part of the fuel supply guide tube so as to permit passage therethrough of the fuel (see, for example, Japanese Patent Laid-open No. 2009-101854).

SUMMARY OF THE INVENTION

In the above-mentioned background art, however, the flame arrester covers the lower opening part of the fuel supply guide tube. Due to this configuration, it has been impossible to insert a hose or the like via the fuel supply port and extract the fuel present in the fuel tank. On the other hand, when an outer wall of the fuel tank is separately provided with an opening in addition to the fuel supply port, a lid for the opening must be formed in a hermetic closure structure, which may lead to a larger-sized fuel tank.

In view of the foregoing, it is an object of the present invention to ensure that, in a fuel tank for a vehicle in which a lower opening part of a fuel supply guide tube is covered with a flame arrester, a fuel can be extracted via a fuel supply port.

As a means for solving the above-mentioned problem, according to a first aspect of the present invention, there is provided a fuel tank for a vehicle (26, 126, 226, 326, 426, 526, 626, 726, 826) including a fuel supply port device (40, 140, 240, 340, 440, 540, 640, 740, 840) which includes a fuel supply port (34) provided at an upper wall (32a, 132a) of a tank body (31, 131), a tank cap (35, 135) for closing an opening of the fuel supply port (34), a fuel supply guide tube (41) extending from the fuel supply port (34) into the tank body (31, 131), and a flame arrester (42, 142) for covering a lower opening part of the fuel supply guide tube (41) so as to permit a fuel to flow into the tank body (31) and for discharging air present in the tank body (31, 131), wherein the fuel supply port device (40, 140, 240, 340, 440, 540, 640, 740, 840) includes an insertion hole (45, 145, 245, 345, 445, 545, 645, 745, 845) through which the inside of the fuel supply port device (40, 140, 240, 340, 440, 540, 640, 740, 840) and the inside of the tank body (31, 131) communicate with each other and through which a tool (H) for extracting the fuel is inserted, and an open-close lid (46, 146, 246, 346, 446, 546, 646, 746, 846) for opening and closing the insertion hole (45, 145, 245, 345, 445, 545, 645, 745, 845).

According to a second aspect of the present invention, a gun stopper (43, 43'), which makes contact with a fuel gun and restricts the insertion amount of the fuel gun into the tank body (31), is provided in the fuel supply port device (40, 140, 240, 340, 440, 540, 740), and the insertion hole (45, 145, 245, 345, 445, 545, 745) and the open-close lid (46, 146, 246, 346, 446, 546, 746) are provided below the gun stopper (43, 43').

According to a third aspect of the present invention, at least a part of the insertion hole (45, 145, 245, 345, 445, 545, 745) is provided at such a position as to avoid the gun stopper (43, 43'), as viewed in the axial direction of the fuel supply port (34).

According to a fourth aspect of the present invention, at least a part of the insertion hole (45, 145, 245, 345, 445, 545, 745) is provided at such a position as to overlap with the fuel supply port (34), as viewed in the axial direction of the fuel supply port (34).

According to a fifth aspect of the present invention, the open-close lid (46, 246, 446, 546, 646, 746) is normally biased by an elastic member (48, 248, 448, 548, 648, 748) in a direction for closing the insertion hole (45, 245, 445, 545, 645, 745).

According to a sixth aspect of the present invention, the insertion hole (145) is a screw hole, and the open-close lid (146) is a screw member to be screw-engaged with the insertion hole (145).

According to a seventh aspect of the present invention, the open-close lid (346) is provided with a screw part (347), and the open-close lid (346) is opened and closed by changing a screw engagement position of an adjusting screw member (347a) screw-engaged with the screw part (347).

According to a eighth aspect of the present invention, the flame arrester (42) includes: a peripheral wall part (42a) formed in a cylindrical shape so as to surround the gun stopper (43, 43') over the whole circumference of the gun stopper (43, 43'); a cap member (44, 444, 544) for covering a lower opening (42e) of the peripheral wall part (42a); and communication holes (42f) which are smaller in diameter than the insertion hole (45, 145, 245, 345, 445, 545, 645, 745) and which permit the fuel to flow from the inside of the fuel supply port device (40, 140, 240, 340, 440, 540, 640, 740) into the inside of the tank body (31) are provided in the peripheral wall part (42a) and the cap member (44, 444, 544).

According to a ninth aspect of the present invention, the insertion hole (445, 545) is the lower opening (42e) of the peripheral wall part (42a), and the open-close lid (446, 546) is at least a part of the cap member (444, 544).

According to a tenth aspect of the present invention, the insertion hole (645) and the open-close lid (646) are provided in the fuel supply guide tube (41).

According to an eleventh aspect of the present invention, the flame arrester (142) has a cylindrical part (142a) extending vertically and a taper part (142b) continuous with and on the lower side of the cylindrical part and gradually reduced in diameter toward the lower side, the taper part (142b) is formed with the insertion hole (845) at the lower end thereof, and the taper part (142b) is provided with a smooth part (143b) having no communication hole (42f) for permitting the fuel to flow therethrough.

According to a twelfth aspect of the present invention, the tank cap (135) is turnably supported on the periphery of the fuel supply port (34) on either the front side or the rear side thereof so as to open and close the fuel supply port (34), and the smooth part (143b) is provided on each of the left and right sides of the taper part (142b).

According to a thirteenth aspect of the present invention, the open-close lid (846) is supported by the flame arrester (142) in the state of being biased in a direction for closing the insertion hole (845), and a flat part (142c, 142d) for forming a seal relative to the open-close lid (845) is provided at the periphery of the insertion hole (845).

According to a fourteenth aspect of the present invention, the flat part (142d) is formed by bending back the lower end of the taper part (142b) to the outer circumference side.

According to the first aspect of the present invention, the fuel supply port device is provided with the insertion hole through which the tool for extracting the fuel is inserted, and with the open-close lid for opening and closing the insertion hole. Therefore, it is possible to insert a fuel-extracting tool such as a hose into the fuel supply port device via the fuel supply port, to advance the tool from the inside of the fuel supply port device into the tank body through the insertion hole, and to extract the fuel present in the tank body. Consequently, it is unnecessary to separately provide an outer wall of the fuel tank with an opening or a mechanism for extracting the fuel, and it is possible to prevent the fuel tank from being enlarged in size.

In addition, while the fuel supply port device is provided with an insertion hole of such a size that the fuel-extracting tool such as a hose can be inserted therethrough, the insertion hole is opened and closed with the open-close lid, which ensures that when the open-close lid is kept closed, the function of the fuel supply port device provided with the flame arrester can be obtained in the same manner as before.

According to the second aspect of the present invention, the insertion hole and the open-close lid are provided below the gun stopper. This makes it possible to prevent the open-close lid from being opened due to contact of the fuel gun with the open-close lid when the fuel gun is inserted into the fuel supply port device.

According to the third aspect of the present invention, at least a part of the insertion hole is not hidden behind the gun stopper. This ensures that at the time when the fuel-extracting tool such as a hose inserted via the fuel supply port is inserted into the insertion hole, the inserting operation can be carried out while checking the position of the insertion hole through the fuel supply port. Consequently, the tool can be easily inserted into the insertion hole, and the workability in extracting the fuel can be enhanced.

According to the fourth aspect of the present invention, at least a part of the insertion hole is provided at such a position as to overlap with the fuel supply port. This ensures that at the time when the fuel-extracting tool such as a hose inserted via the fuel supply port is inserted into the insertion hole, it suffices to lower the hose or the like downward from the fuel supply port. Consequently, the tool can be easily inserted into the insertion hole, and the workability in extracting the fuel can be enhanced.

According to the fifth aspect of the present invention, the open-close lid is normally biased by the elastic member in the direction for closing the insertion hole. This ensures that at the time of putting the fuel-extracting tool such as a hose into and out of the insertion hole, it is unnecessary to separately perform an operation of opening and closing the open-close lid. As a result, the workability in extracting the fuel can be enhanced.

According to the sixth aspect of the present invention, the open-close lid is a screw member to be screw-engaged with the insertion hole. This ensures that generation of noise due to repeated opening and closing of the open-close lid can be prevented from occurring because of vibrations during running of the vehicle.

According to the seventh aspect of the present invention, the open-close lid is opened and closed by use of the screw part provided on the open-close lid and the adjusting screw member screw-engaged therewith. Consequently, generation of noise due to repeated opening and closing of the open-close lid can be prevented from occurring because of vibrations during running of the vehicle.

According to the eighth aspect of the present invention, the communication holes are formed in the peripheral wall part of the flame arrester and the cap member. This ensures that flow of the fuel into the tank body and discharge of air present in the tank body can be performed smoothly.

According to the ninth aspect of the present invention, the lower opening of the peripheral wall part formed in a cylindrical shape is utilized as the insertion hole, and the cap member covering the lower opening is utilized as the open-close lid, whereby the need to separately provide the insertion hole and the open-close lid is eliminated, and the number of component parts can be reduced. In addition, with the lower opening of the peripheral wall part utilized as the insertion hole, a large insertion hole can be secured, insertion of the fuel-extracting tool such as a hose is facilitated, and the workability in extracting the fuel can be enhanced thereby.

According to the tenth aspect of the present invention, the fuel supply guide tube near the fuel supply port is provided with the insertion hole and the open-close lid. Therefore, the insertion hole and the open-close lid can be laid out near the fuel supply port. Consequently, insertion of the fuel-extracting tool such as a hose into the tank body is facilitated, and the workability in extracting the fuel can be enhanced.

According to the eleventh aspect of the present invention, the fuel-extracting tool or the fuel gun (hereafter these will be generically referred to as the fuel gun or the like) inserted into the fuel supply port device can be guided to the insertion hole by the taper part, and guiding of the fuel gun and the like by the smooth part of the taper part can be performed smoothly.

According to the twelfth aspect of the present invention, it is ensured that, while the fuel gun or the like is inserted obliquely from the upper side on either the left or right side of the fuel supply port device at the time of inserting the fuel gun or the like into the fuel supply port device in the condition where the tank cap is opened, the fuel gun or the like can be guided to the insertion hole smoothly because of the presence of the smooth parts provided along the inserting direction.

According to the thirteenth aspect of the present invention, easy sealing can be made between the insertion hole and the open-close lid.

According to the fourteenth aspect of the present invention, the fuel gun or the like can be prevented from being caught on the flat part, as contrasted to the case where the flat part is formed by bending back the lower end of the taper part to the inner circumference side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
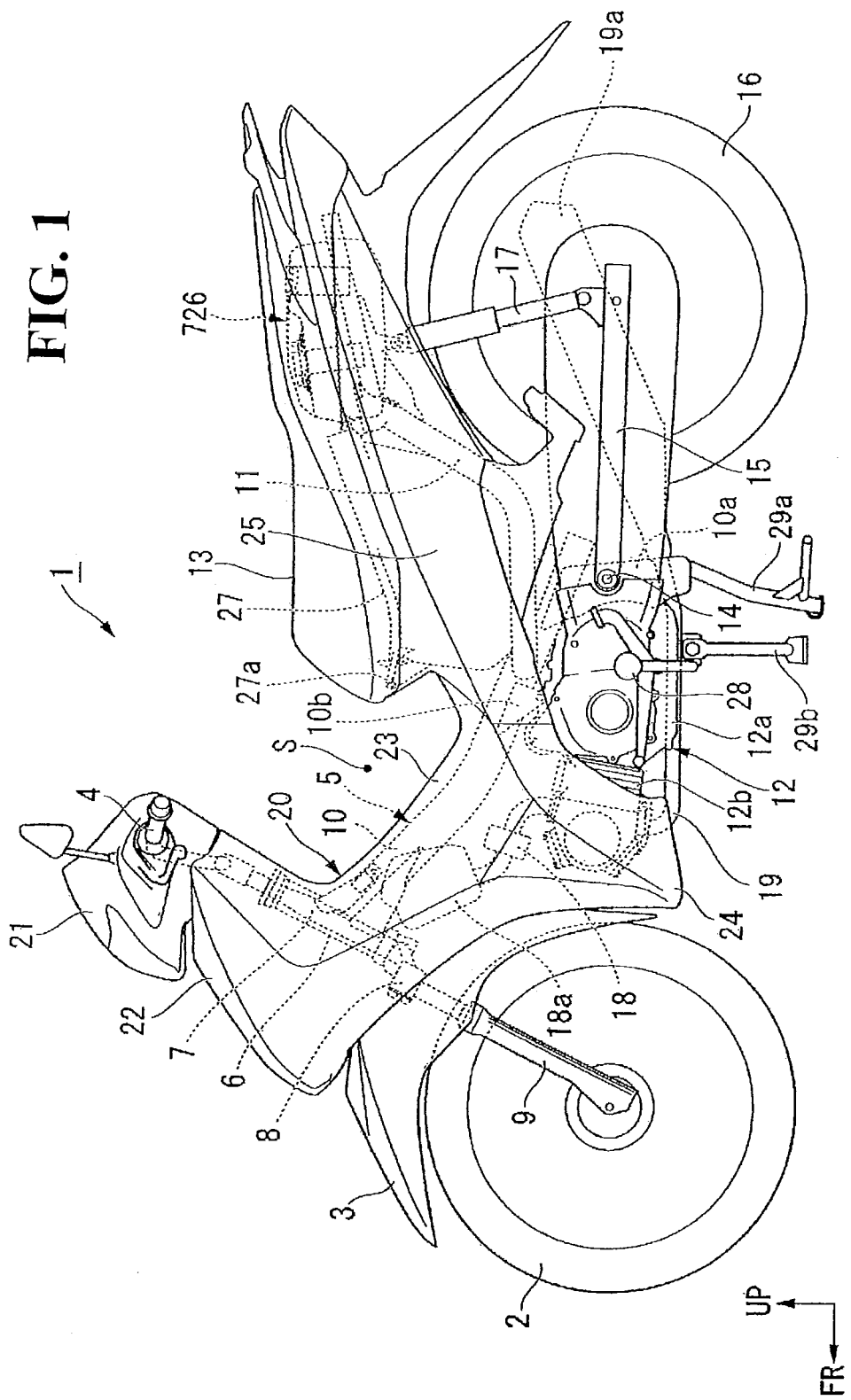
FIG. 1 is a left side view of a motorcycle in each embodiment of the present invention.

The present invention will now be described with reference to the accompanying drawings, wherein the same reference numerals have been used to identify the same or similar elements throughout the several views. Incidentally, the directions such as forward, rearward, left and right directions in the following description are the same directions as those in the vehicle described below, unless specified otherwise. Besides, at appropriate parts in the drawings used in the following description, arrow FR indicative of the front side of the vehicle and arrow LH indicative of the left side of the vehicle and arrow UP indicative of the upper side of the vehicle are shown.

First Embodiment

FIG. 1 shows a motorcycle 1 as a saddle type vehicle to which a structure according to a first embodiment of the present invention has been applied. First, in the motorcycle 1, a front wheel 2 is rotatably provided at a front portion of the vehicle, and a front fender 3 is provided on the upper side of the front wheel 2. A bar handle (handlebar) 4 for steering the front wheel 2 is provided on the upper side of the front fender 3. The bar handle 4 is provided at an upper portion of a steering system 7 rotatably supported on a head pipe 6 formed at the front end of a body frame 5.

A plate-shaped lower bridge 8 extending in the left-right direction is provided at a lower portion of the steering system 7. The upper ends of a pair of left and right front forks 9 for rotatably supporting the front wheel 2 on their lower portions are fixed to left and right end portions of the lower bridge 8. In short, the front forks 9 are laid out on the lower side of the head pipe 6.

The body frame 5 includes: a main frame 10 composed of a single steel-made pipe member rectangular in section which extends rearwardly downward from the head pipe 6; seat rails 11 which are branched to the left and right sides from a rear portion of the main frame 10, extend substantially horizontally rearward, then extend rearwardly upward, and thereafter extend again substantially horizontally rearward; and pivot plates 10a extending downward from rear end portions of the main frame 10.

An air-cooled single-cylinder engine 12 is supported on the front side of the pivot plates 10a and on the rear lower side of the main frame 10. A seat 13 on which riders are to be seated is disposed on the upper side of the seat rails 11, and a rear cover 25 for covering the periphery of the seat rails 11 is provided on the lower side of the seat 13. The seat 13 is elongated in the front-rear direction. A front part upper surface of the seat 13 serves as a driver seating surface, while a rear part upper surface of the seat 13 serves as a pillion passenger seating surface.

The engine 12 is disposed with a crankshaft (not shown) set along the left-right direction. A cylinder 12b protrudes forward, in a substantially horizontal state, from a front end portion of a crankcase 12a of the engine 12. A rear portion of the crankcase 12a is supported on the pivot plates 10a, and an upper portion of the crankcase 12a is supported on an engine hanger 10b extending from the main frame 10.

In the motorcycle 1, a straddling space S, straddled by the driver when the driver is seated on the seat 13, is formed on the front side of the seat 13 and on the upper side of the main frame, more accurately, between the seat 13 and the head pipe 6, on the upper side of the main frame 10 and on the upper side of a main frame cover 23. Steps 28 on which the driver seated on the seat 13 puts his or her feet are supported on lower portions of the crankcase 12a. A main stand (center stand) 29a for supporting the vehicle body in an upright state is storably supported on lower end portions of the pivot plates 10a. A side stand 29b for supporting the vehicle body of the motorcycle 1 in a leftwardly inclined erect state is stored, also storably, on a lower surface of the crankcase 12a on the left side relative to the vehicle body center line CL (see FIG. 3) of the motorcycle 1 in the vicinity of the base end of the step 28.

A front end portion of a swing arm 15 is vertically swingably supported on the pivot plates 10a through a pivot shaft 14. A rear wheel 16 is rotatably supported on a rear end portion of the swing arm 15. A rear cushion 17 is interposed between a rear portion of the swing arm 15 and a rear portion of the seat rail 11.

The downstream side of a throttle body (or a carburetor) 18 is connected to an upper portion of the cylinder 12b of the engine 12, and an air cleaner box 18a is connected to the upstream side of the throttle body 18. An exhaust pipe 19 is led out from a lower portion of the cylinder 12b of the engine 12. The exhaust pipe 19 extends rearward in a curved form, and is connected to a silencer 19a so disposed as to extend rearwardly upward on the right side of the rear wheel 16.

A body cover 20 constituting the vehicle appearance of the motorcycle 1 is composed of a plurality of resin-made cover bodies. Specifically, the body cover 20 includes: a handle cover 21 covering the central side of the bar handle 4 in such a manner that left and right end portions of the bar handle 4 protrude to the outside; a front cover 22 disposed below the handle cover 21 and above the front fender 3; a main frame cover 23 connected to the rear end of the front cover 22 and surrounding principally the main frame 10; a lower cover 24 connected to the lower ends of the front cover 22 and the main frame cover 23 and covering mainly the lateral sides of the cylinder 12b of the engine 12; and a rear cover 25 connected to the rear ends of the main frame cover 23 and the lower cover 24 and covering mainly the lower side of the seat 13.

Front and rear end portions of a fuel tank 726 are supported respectively on rearwardly extended portions of rear portions of the seat rails 11. Incidentally, a rear end portion of a storage box 27 disposed on the front lower side of the seat 13 is supported, together with a front end portion of the fuel tank 726, on front end portions of the rearwardly extended portions. A front end portion of the seat 13 is supported on a front end portion of the storage box 27, through a turning shaft 27a set along the left-right direction. With the seat 13 turned in the up-down direction about the turning shaft 27a, access to the storage box 27 and the fuel tank 26 is secured.

Figure 2:
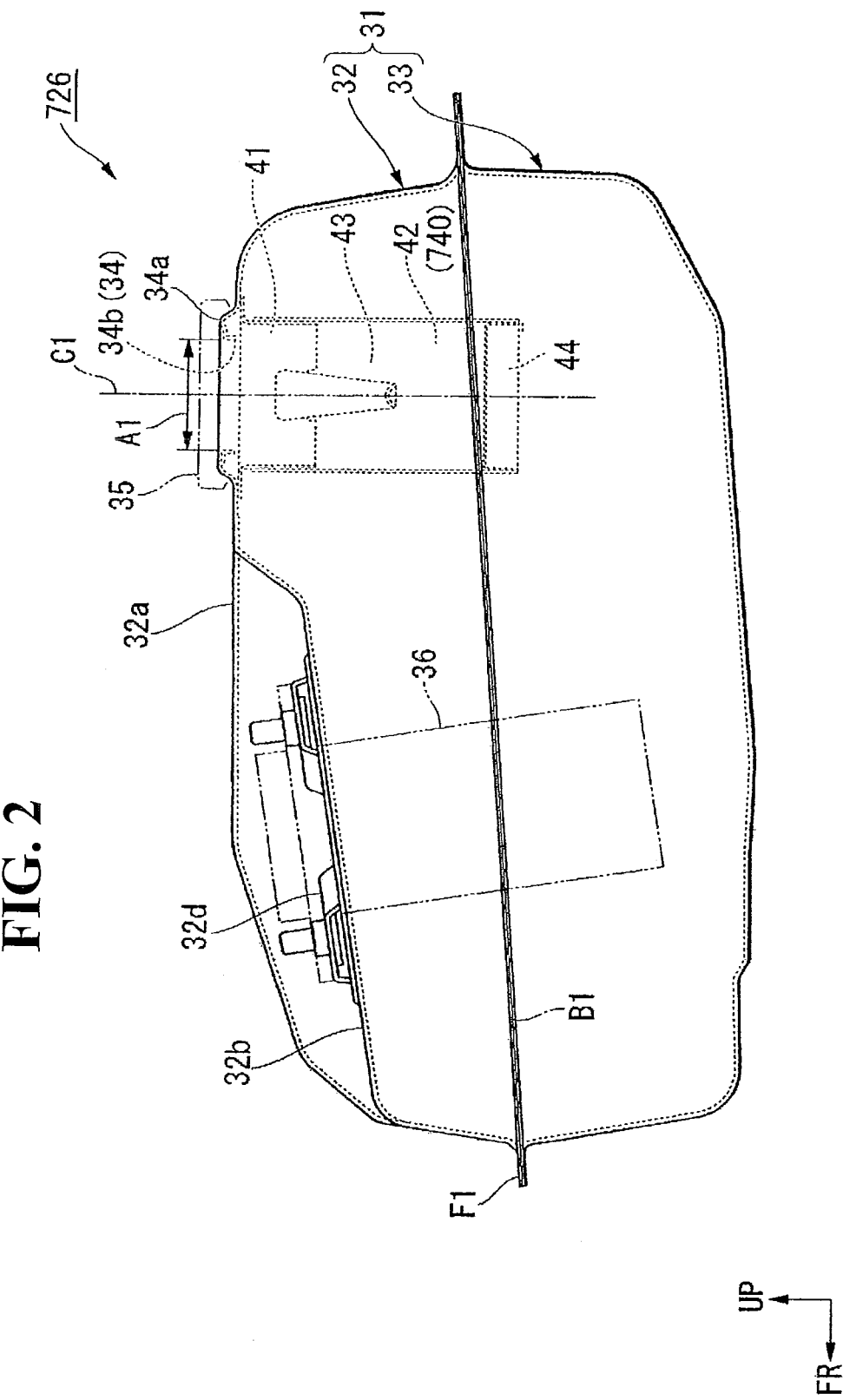
FIG. 2 is a left side view of a fuel tank in a first embodiment of the invention.
Figure 3:
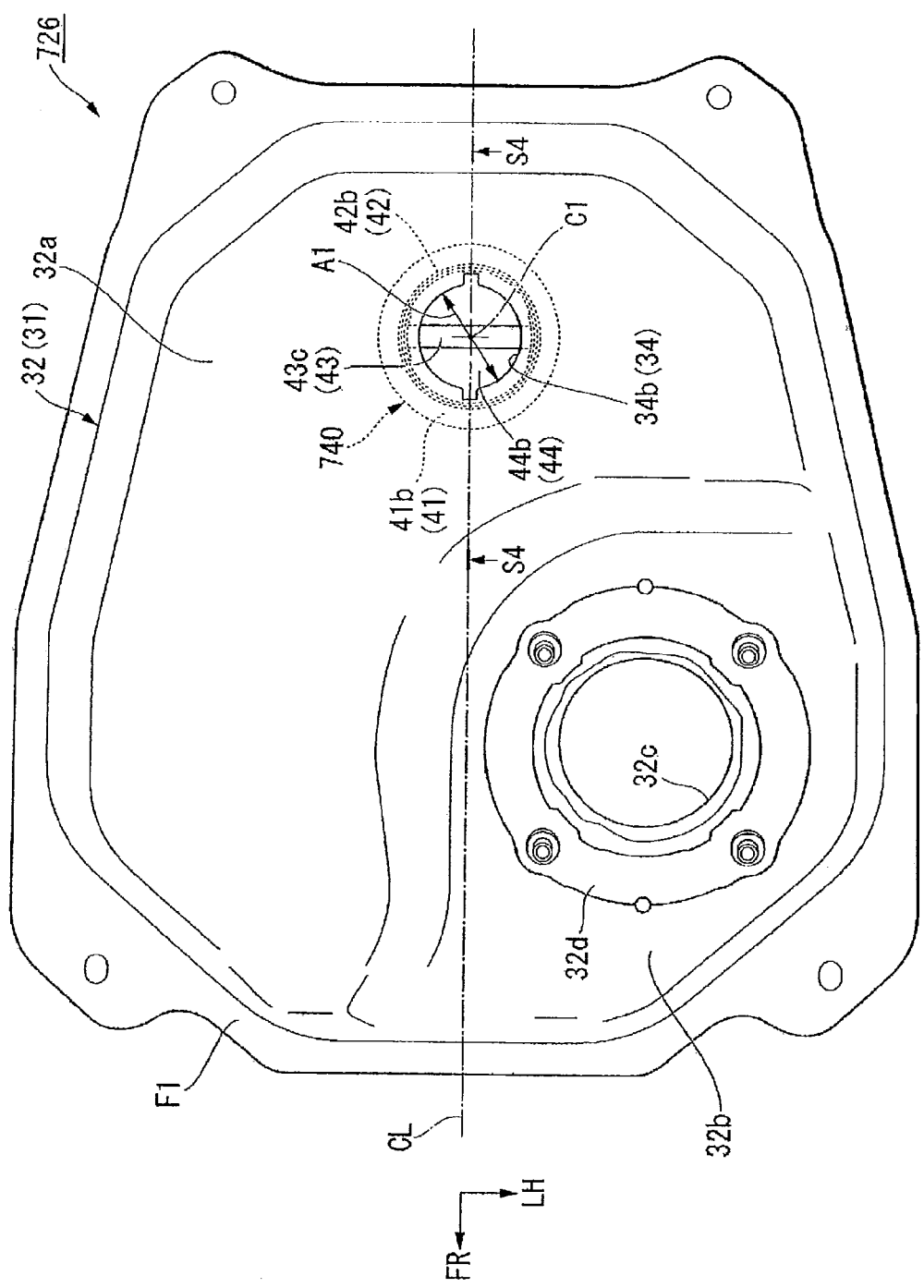
FIG. 3 is a top plan view of the fuel tank.

Referring to FIGS. 2 and 3, the fuel tank 726 has a substantially rectangular parallelepiped hollow tank body 31 formed by uniting upper and lower split bodies 32 and 33 at a substantially horizontal mating surface B1. The upper split body 32 is in the shape of a vessel opened to the lower side, while the lower split body 33 is in the shape of a vessel opened to the upper side. The upper and lower split bodies 32 and 33 are pressed products of steel sheet. The downward open end of the upper split body 32 and the upward open end of the lower split body 33 are welded to each other through joint flanges F1 formed along the mating surface B1.

A substantially horizontal upper wall part 32a of the tank body 31 (upper split body 32) is provided at a rear portion thereof with a fuel supply port 34 which is circular in top plan view, and to and from which a tank cap 35 of a screw type, for example, can be attached and detached. The upper wall part 32a is formed, at the left side of a front portion thereof, with a left front flat portion 32b, which is displaced to the lower side in a stepped manner and which is slightly slanted forwardly downward. A fuel pump 36 is mounted to the tank body 31, in the state of fronting on the inside of the tank body 31, by an opening 32c formed in the left front flat portion 32b and a bracket 32d fixed from above to the periphery of the opening 32c. Incidentally, symbol CL in FIG. 3 denotes the vehicle body center line of the motorcycle 1.

Here, the motorcycle 1 is a vehicle in which an ethanol fuel can also be used as an engine fuel, and the ethanol fuel is reserved in the fuel tank 726. A fuel supply port device 740 including a flame arrester 42 is provided at the fuel supply port 34 of the fuel tank 726.

Figure 4A:
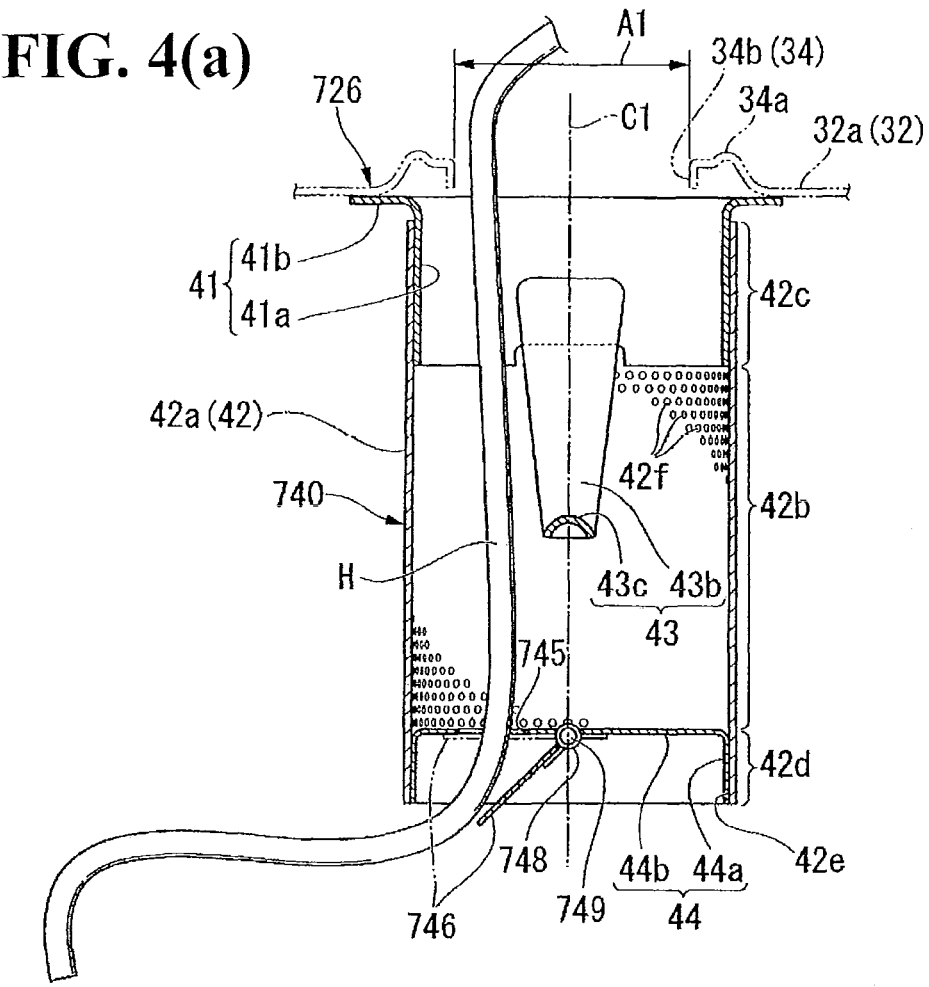
FIG. 4(a) is a sectional view taken along line S4-S5 of FIG. 3.
Figure 4B:
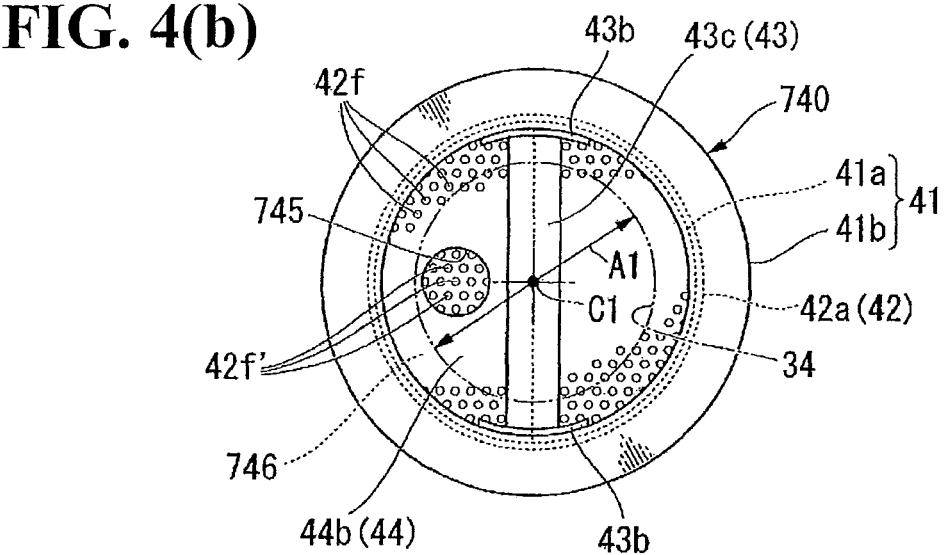
FIG. 4(b) is a top plan view of a fuel supply port device shown in FIG. 4(a)

Referring to FIG. 4 also, the fuel supply port device 740 has the fuel supply port 34, a fuel supply guide tube 41 continuous with the lower side of the fuel supply port 34 and extending into the tank body 31, the flame arrester 42 so provided as to cover a lower opening portion of the fuel supply guide tube 41, and a gun stopper 43 provided inside the flame arrester 42 to restrict the insertion amount of a fuel gun (not shown).

The fuel supply port 34 is provided at a circumferential edge portion thereof with a ring-shaped frame part 34a which has an upwardly protuberant mountain-like sectional shape and extends in the circumferential direction. A cylindrical inner circumferential wall portion 34b folded back to the inner circumference side and to the lower side, of the frame part 34a, extends toward the lower side (the inside of the tank body 31) along a fuel supply port axis C1 which is substantially along the vertical direction. The inside diameter of the inner circumferential wall portion 34b is the inside diameter of the opening of the fuel supply port 34. Hereafter, the opening region of the inside diameter in the axial-direction view of the fuel supply port 34 is denoted by symbol A1. The fuel supply port axis C1 is located on the above-mentioned vehicle body center line CL.

The fuel supply guide tube 41 has a peripheral wall part 41a which is in a cylindrical shape coaxial with the fuel supply port 34 and comparatively shallow in the vertical direction, and a flange part 41b formed at the outer circumference of the upper end of the peripheral wall part 41a. The flange part 41b abuts on a flat portion of the upper wall part 32a on the outer circumference side of the fuel supply port 34 from the lower side (the inside of the tank body 31), and these parts are united by welding or the like. On the outer periphery of the peripheral wall part 41a of the fuel supply guide tube 41, an upper portion of a peripheral wall part 42a of the flame arrester 42 which is in a cylindrical shape coaxial therewith and elongated in the vertical direction is fitted, and these are united by welding or the like.

The flame arrester 42 is a member which permits flow of the fuel into the tank body 31 and through which air in the tank body 31 can be discharged. The flame arrester 42 has the peripheral wall part 42a, and a cap member 44 for closing a lower opening 42e of the peripheral wall part 42a.

The peripheral wall part 42a has a perforated mesh portion 42b composed, for example, of a steel sheet formed with a multiplicity of small holes (communication holes 42f). The peripheral wall part 41a of the fuel supply guide tube 41 is fitted on the inner periphery of an upper portion 42c of the peripheral wall part 42b, and these are united by welding or the like. On the inner periphery of a lower portion 42d of the peripheral wall part 42b, a peripheral wall part 44a of the cap member 44, which is coaxial therewith, is fitted, and these are united by welding or the like.

The cap member 44 is formed in a bottomed cylindrical shape, which is opened to the lower side and comparatively shallow in the vertical direction. A bottom wall part 44b and a peripheral wall part 44a of the cap member 44 are formed in mesh form provided with a multiplicity of small holes (communication holes 42f), like the mesh portion 42b of the flame arrester 42, and permit flow of the fuel. The peripheral wall part 44a of the cap member 44 is united to the lower portion 42d of the flame arrester 42 by welding or the like.

A gun stopper 43 restricts the insertion amount of the fuel gun into the tank body 31, and prevents the fuel gun from making contact with the flame arrester 42. The gun stopper 43 integrally has a pair of support arm parts 43b an upper portion of which is joined to the inner periphery of the peripheral wall part 41a of the fuel supply guide tube 41, and a bridge part (stopper body) 43c bridging between the lower ends of the support arm parts 43b. The outer periphery of the gun stopper 43 is surrounded by the peripheral wall part 42a of the flame arrester 42. The cap member 44 is located on the lower side of the gun stopper 43.

Here, the fuel supply port device 740 includes an insertion hole 745 through which the inside of the fuel supply port device 740 and the inside of the tank body 31 communicate with each other and through which a tool (hose H) for extracting the fuel can be inserted into the tank body 31 via the fuel supply port 34, and an open-close lid 746 for opening and closing the insertion hole 745.

The insertion hole 745 is a hole which is formed in the bottom wall part 44b of the cap member 44 and is, for example, circular in shape. The insertion hole 745 is located at such a position (in an opening region A1) as to overlap with the fuel supply port 34 and to avoid the gun stopper 43 (the bridge part 43c), as viewed in the axial direction of the fuel supply port 34.

The insertion hole 745 is closed with the open-close lid 746, which is formed with a multiplicity of small holes (communication holes 42f), like the mesh portion 42b. Incidentally, the communication holes 42f and 42f' formed in the flame arrester 42 and a mesh plate 47 have a diameter (about φ1 to 1.5 mm) much smaller than the diameter (about φ10 to 30 mm) of the insertion hole 745.

The open-close lid 746 is in the shape of a flat plate substantially orthogonal to the fuel supply port axis C1, and is provided in a semicircular shape corresponding to the side of the insertion hole 745 of the bottom wall part 44b, for example. The open-close lid 746 supported on the lower surface side of the bottom wall part 44b of the cap member 44 so that it can be opened and closed through a hinge shaft 749 extending along a radial direction, for example. Specifically, the insertion hole 745 can be opened and closed with the open-close lid 746. The insertion hole 745 is located on the upper side of the open-close lid 746.

The open-close lid 746 is biased in the direction for closing the insertion hole 745, for example by a helical torsion spring 748 through which the hinge shaft 749 is passed. To be more specific, even in the case where the insertion hole 745 for only ensuring that the tool (such as a hose H) for extracting the fuel can be inserted into the cap member 44 and hence into the fuel supply port device 740, the function of the fuel supply port device 740 provided with the flame arrester 42 can be obtained in the same manner as before, since the open-close lid 746 is normally in the closed state.

On the other hand, at the time of an operation of extracting the fuel present in the tank body 31 by a tool (such as a hose H) for extracting the fuel, the open-close lid 746 is pushed with the tip of the hose H inserted via the fuel supply port 34 into the fuel supply port device 740, to push open the open-close lid 746 to the lower side (in the opening direction) against a biasing force of the helical torsion spring 748, whereby the insertion hole 745 can be opened and the hose H can be permitted to reach the outside of the fuel supply port device 740 (the inside of the tank body 31). Besides, after the fuel in the tank body 31 is extracted through the hose H, the insertion hole 745 is closed with the open-close lid 746 and an initial condition is recovered, by only withdrawing the hose H upward from the insertion hole 745.

As has been described above, the fuel tank for vehicle 726 in the above embodiment has the fuel supply port device 740 which includes the fuel supply port 34 provided at the upper wall part 32a of the tank body 31, the tank cap 35 for closing the opening of the fuel supply port 34, the fuel supply guide tube 41 extending from the fuel supply port 34 into the tank body 31, and the flame arrester 42 for covering the lower opening portion of the fuel supply guide tube 41 so as to permit flow of the fuel into the tank body 31 and for the discharge of air present in the tank body 31, wherein the fuel supply port device 740 has the insertion hole 745 through which the inside of the fuel supply port device 740 and the inside of the tank body 31 communicate with each other and through which the tool (hose H) for extracting the fuel is inserted, and the open-close lid 746 for opening and closing the insertion hole 745.

According to this configuration, the fuel in the tank body 31 can be extracted by a method in which the tool (such as a hose H) for extracting the fuel is inserted via the fuel supply port 34 into the fuel supply port device 740 and the tool is advanced from the inside of the fuel supply port device 740 into the tank body 31 through the insertion hole 745. Therefore, it is unnecessary to separately provide the outer wall of the fuel tank 726 with an opening or a mechanism for extracting the fuel, so that the fuel tank 726 can be prevented from being enlarged in size.

In addition, while the fuel supply port device 740 is provided with the insertion hole 745 of such a size as to permit the tool (such as the hose H) for extracting the fuel to be inserted therethrough, the insertion hole 745 can be opened and closed with the open-close lid 746 and, therefore, the function of the fuel supply port device 740 provided with the flame arrester 42 can be obtained in the same manner as before, if the open-close lid 746 is kept closed.

Besides, the fuel tank for vehicle 726 has a configuration in which the gun stopper 43 for making contact with the fuel gun to thereby restrict the insertion amount of the fuel gun into the tank body 31 is provided in the fuel supply port device 740, and the insertion hole 745 and the open-close lid 746 are provided below the gun stopper 43. This configuration ensures that when the fuel gun is inserted into the fuel supply port device 740, the fuel gun can be prevented from making contact with the open-close lid 746 to open the open-close lid 746.

In addition, the fuel tank for vehicle 726 is so configured that at least a part of the insertion hole 745 is provided at such a position as to overlap with the fuel supply port 34, as viewed in the axial direction of the fuel supply port 34. This configuration ensures that at the time when the fuel-extracting tool such as a hose H inserted via the fuel supply port 34 is inserted into the insertion hole 745, it suffices to lower the hose H or the like downward from the fuel supply port 34. Consequently, insertion of the tool into the insertion hole 745 is facilitated, and the workability in extracting the fuel can be enhanced.

Besides, the fuel tank for vehicle 726 has a configuration in which at least a part of the insertion hole 745 is provided at such a position as to avoid the gun stopper 43, as viewed in the axial direction of the fuel supply port 34. This ensures that at the time when the fuel-extracting tool such as the hose H inserted via the fuel supply port 34 is inserted into the insertion hole 745, the inserting operation can be carried out while checking the position of the insertion hole 745 through the fuel supply port 34. Consequently, insertion of the tool into the insertion hole 745 is facilitated, and the workability in extracting the fuel can be enhanced.

In addition, the fuel tank for vehicle 726 is so configured that the open-close lid 746 is normally biased by the helical torsion spring 748 in the direction for closing the insertion hole 745. This ensures that at the time of putting the fuel-extracting tool such as a hose H into and out of the insertion hole 745, it is unnecessary to separately perform an operation of opening and closing the open-close lid 746, so that the workability in extracting the fuel can be enhanced.

Besides, the fuel tank for vehicle 726 has a configuration in which the flame arrester 42 is provided with the peripheral wall part 42a formed in a cylindrical shape so as to surround the gun stopper 43 along the whole circumference of the latter, and the cap member 44 for covering the lower opening 42e of the peripheral wall part 42a, and in which the communication holes 42f being smaller than the insertion hole 745 and permitting both flow of the fuel from the inside of the fuel supply port device 740 into the tank body 31 and discharge of air present in the tank body 31 is provided in the peripheral wall part 42a and the cap member 44. This ensures that both the flow of the fuel into the tank body 31 and the discharge of air present in the tank body 31 can be performed smoothly.

Second Embodiment

Now, a second embodiment of the present invention will be described referring to FIG. 5 while referring also to FIGS. 1 and 1

This embodiment differs from the above-described first embodiment particularly in that an open-close lid 46 for opening and closing an insertion hole 45 for inserting a fuel-extracting tool therethrough is composed of a part of a mesh plate 47 covering a lower opening 42 of a peripheral wall part 42a. The other parts which are the same as those in the first embodiment above are denoted by the same reference symbols as used above, and descriptions of the other parts will be omitted.

Figure 5A:
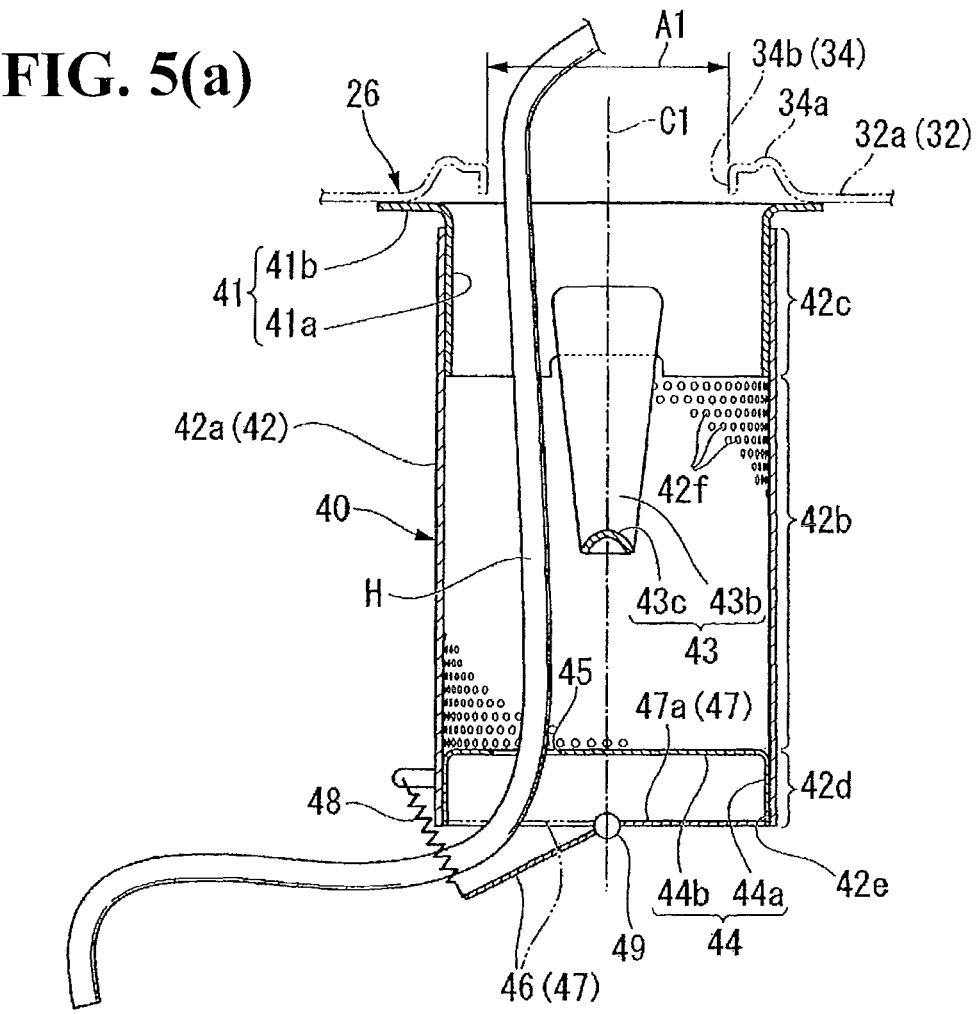
FIG. 5(a) is a sectional view, corresponding to FIG. 4, in a second embodiment of the invention.
Figure 5B:
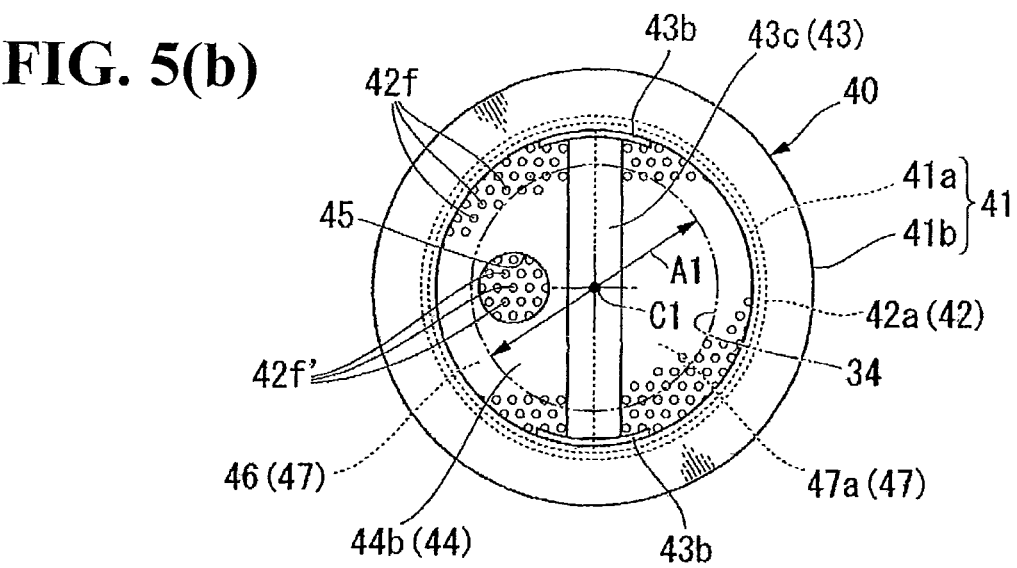
FIG. 5(b) is a top plan view of a fuel supply port device shown in FIG. 5(a)

In a fuel supply port device 40 shown in FIG. 5, the insertion hole 45 is a hole which is formed in a bottom wall part 44b of a cap member 44 and which is, for example, circular in shape. The insertion hole 45 is located at such a position (in an opening region A1) as to overlap with a fuel supply port 34 and to avoid a gun stopper 43 (a bridge part 43c), as viewed in the axial direction of the fuel supply port 34.

The lower opening 42e of the peripheral wall part 42a (cap member 44) is closed with the mesh plate 47, which is formed with a multiplicity of small holes (communication holes 42f'), like a mesh portion 42b. Incidentally, the communication holes 42f and 42f' formed in the flame arrester 42 and the mesh plate 47 have a diameter (about φ1 to 1.5 mm) much smaller than the diameter (about φ10 to 30 mm) of the insertion hole 45.

The mesh plate 47 is in the shape of a flat plate substantially orthogonal to the fuel supply port axis C1, and is bisected, for example, along a radial direction into a pair of halves. One of the halves is provided as a fixed lid 47a which is fixed to the lower opening 42e of the peripheral wall part 42a and which closes half the area of the lower opening 42c. The other of the halves is provided as an open-close lid 46 which can be opened and closed relative to the fixed lid 47, through a hinge shaft 49 extending along a radial direction, for example. The open-close lid 46 opens and closes half the area of the lower opening 42e of the peripheral wall part 42a and, hence, the insertion hole 45. The insertion hole 45 is located on the upper side of the open-close lid 46.

The open-close lid 46 is biased in the direction for closing the lower opening 42e (and the insertion hole 45) of the peripheral wall part 42a by, for example, a helical tension spring 48 disposed at the outer periphery of a lower portion of the peripheral wall part 42a. Specifically, even in the case where the insertion hole 45 for only inserting a fuel-extracting tool such as a hose H is provided in the cap member 44 and, hence, in the fuel supply port device 40, the function of the fuel supply port device 40 equipped with a flame arrester 42 can be obtained in the same manner as before, since the open-close lid 46 is normally in the closed state. Incidentally, a helical torsion spring, a leaf spring or the like may be used, in place of the helical tension spring 48, to bias the open-close lid 46 in the closing direction. In addition, the open-close lid 46 may open and close an area of more than half of the lower opening 42e of the peripheral wall part 42e, or an area of less than half the lower opening 42a, or the whole area of the lower opening 42e.

On the other hand, at the time of performing an operation of extracting the fuel present in a tank body 31 by a fuel-extracting tool such as a hose H, the hose H inserted via the fuel supply port 34 into the fuel supply port device 40 is further inserted into the insertion hole 45, and the open-close lid 46 is pushed by the tip of the hose H to push open the open-close lid 46 downward (in the opening direction) against the biasing force of the helical tension spring 48, whereby the lower opening 42e of the peripheral wall part 42a can be opened and the hose H can be brought to the outside of the fuel supply port device 40 (to the inside of the tank body 31). In addition, after the fuel in the tank body 31 is extracted through the hose H, the lower opening 42e of the peripheral wall part 42a can be closed with the open-close lid 46 and an initial condition can be recovered, by only withdrawing the hose H upward from the insertion hole 45.

As has been described above, in the fuel tank for vehicle 26 equipped with the fuel supply port device 40 in this embodiment, like in the first embodiment above, the fuel supply port device 40 is provided with the insertion hole 45 for securing communication between the inside of the fuel supply port device 40 and the inside of the tank body 31 and for inserting the fuel-extracting tool (hose H) therethrough, and with the open-close lid 46 for opening and closing the insertion hole 45, whereby the fuel-extracting tool such as the hose H can be inserted via the fuel supply port 34 into the fuel supply port device 140 to thereby extract the fuel present in the tank body 31. Therefore, a fuel tank 126 can be prevented from being enlarged in size, and the function of the fuel supply port device 140 equipped with the flame arrester 42 can be obtained in the same manner as before.

In addition, the fuel tank for vehicle 26 has a configuration in which the gun stopper 43 for making contact with a fuel gun to thereby restrict the insertion amount of the fuel gun into the tank body 31 is provided in the fuel supply port device 40, and the insertion hole 45 and the open-close lid 46 are provided below the gun stopper 43. This ensures that at the time when the fuel gun is inserted into the fuel supply port device 40, the fuel gun can be prevented from making contact with the open-close lid 46 to open the open-close lid 46.

In addition, in the fuel tank for vehicle 26, at least a part of the insertion hole 45 is provided at such a position as to overlap with the fuel supply port 34, as viewed in the axial direction of the fuel supply port 34. This ensures that at the time when the fuel-extracting tool such as a hose H inserted via the fuel supply port 34 is inserted into the insertion hole 45, it suffices to lower the hose H or the like downward from the fuel supply port 34. Therefore, insertion of the tool into the insertion hole 45 is facilitated, and the workability in extracting the fuel can be enhanced thereby.

Besides, in the fuel tank for vehicle 26, at least a part of the insertion hole 45 is provided at such a position as to avoid the gun stopper 43, as viewed in the axial direction of the fuel supply port 34. This ensures that at the time when the fuel-extracting tool such as a hose H inserted via the fuel supply port 34 is inserted into the insertion hole 45, the inserting operation can be carried out while checking the position of the insertion hole 45 through the fuel supply port 34. Consequently, insertion of the tool into the insertion hole 45 is facilitated, and the workability in extracting the fuel can be thereby enhanced.

In addition, in the fuel tank for vehicle 26, the open-close lid 46 is normally biased in the direction for closing the insertion hole 45, by the helical tension spring 48. This ensures that at the time of putting the fuel-extracting tool such as a hose H into and out of the insertion hole 45, it is unnecessary to separately perform an operation of opening and closing the open-close lid 46. Accordingly, the workability in extracting the fuel can be enhanced.

Besides, in the fuel tank for vehicle 26, the flame arrester 42 is provided with the peripheral wall part 42a formed in a cylindrical shape so as to surround the gun stopper 43 over the whole circumference of the latter, and with the cap member 44 for covering the lower opening 42e of the peripheral wall part 42a. In addition, communication holes 42f which are smaller than the insertion hole 45 in diameter and which permit flow of the fuel from the fuel supply port device 40 into the tank body 31 are provided in the peripheral wall part 42a and in the cap member 44. This configuration ensures that both flow of the fuel into the tank body 31 and discharge of air present in the tank body 31 can be performed smoothly.

Third Embodiment

Now, a third embodiment of the present invention will be described referring to FIG. 6 and while referring also to FIGS. 1 to 3.

This embodiment differs from the above-described first embodiment particularly in that an insertion hole 145 for inserting a fuel-extracting tool therethrough is a screw hole, and an open-close lid 146 for opening and closing the insertion hole 145 is a bolt. The other parts which are the same as those in the first embodiment above are denoted by the same reference symbols as used above, and descriptions of the other parts will be omitted.

Figure 6A:
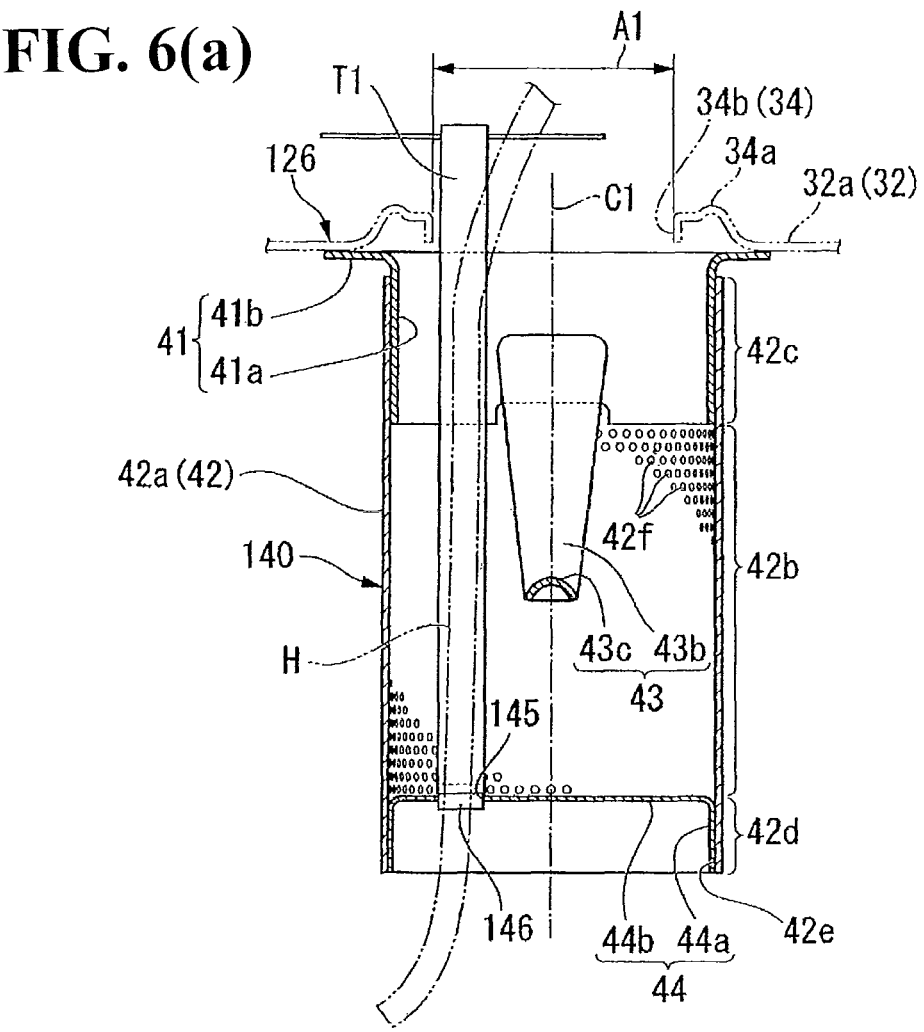
FIG. 6(a) is a sectional view, corresponding to FIG. 4, in a third embodiment of the invention.
Figure 6B:
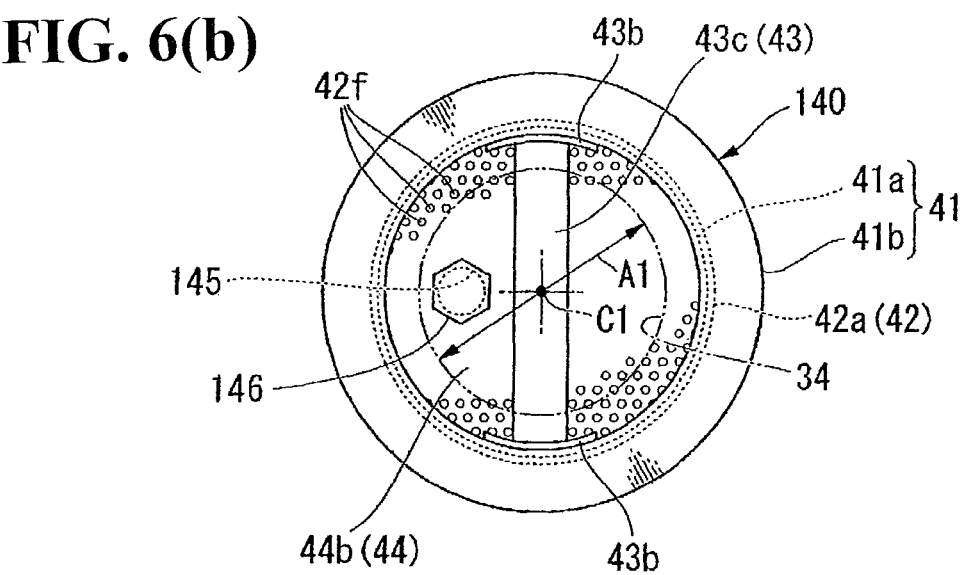
FIG. 6(b) is a top plan view of a fuel supply port device shown in FIG. 6(a)

In a fuel supply port device 140 shown in FIG. 6, the insertion hole 145 is a screw hole parallel to the fuel supply port axis C1, and the insertion hole 145 is closed with a bolt screw-engaged therewith from above as the open-close lid 146. The insertion hole 145 and the open-close lid 146 are located at such a position (in an opening region A1) as to overlap with a fuel supply port 34 and to avoid a gun stopper 43 (bridge part 43c), as viewed in the axial direction of the fuel supply port 34. The open-close lid 146 is attached to and detached from the insertion hole 145 by a method in which an attaching/detaching tool T1 such as a T-type wrench is inserted via the fuel supply port 34 into the fuel supply port device 140, a tip portion of the attaching/detaching tool T1 is engaged with a head portion of the open-close lid 146 (bolt) protruding upward from a bottom wall part 44b of a cap member 44, and the head portion is turned.

Specifically, even in the case where the insertion hole 145 for only inserting the fuel-extracting tool such as a hose H therethrough is provided in the cap member 44 and, hence, in the fuel supply port device 140, the function of the fuel supply port device 140 equipped with the flame arrester 42 can be obtained in the same manner as before, by normally keeping the insertion hole 145 closed by engaging the open-close lid 146 therewith.

On the other hand, at the time of performing an operation of extracting the fuel present in the tank body 31 by a fuel-extracting tool such as a hose H, the open-close lid 146 is dismounted by use of an attaching/detaching tool T1, and then the hose H inserted via the fuel supply port 34 into the fuel supply port device 140 is further inserted into the insertion hole 145, whereby the hose H can be brought to the outside of the fuel supply port device 140 (to the inside of the tank body 31). Besides, after the fuel in the tank body 31 is extracted through the hose H, it suffices to withdraw the hose H upward and to put the open-close lid 146 into screw engagement with the insertion hole 145 by use of the attaching/detaching tool T1, thereby closing the insertion hole 145.

As has been described above, in the fuel tank for vehicle 126 equipped with the fuel supply port device 140 in this embodiment, like in the first embodiment above, the fuel supply port device 140 is provided with the insertion hole 145 for offering communication between the inside of the fuel supply port device 140 and the inside of the tank body 31 and for inserting the fuel-extracting tool (hose H) therethrough, and with the open-close lid 146 for opening and closing the insertion hole 145. This ensures that the fuel in the tank body 31 can be extracted by inserting the fuel-extracting tool such as the hose H via the fuel supply port 34 into the fuel supply port device 140. Therefore, the fuel tank 126 can be prevented from being enlarged in size, and the function of the fuel supply port device 140 equipped with the flame arrester 42 can be obtained in the same manner as before.

In addition, in the fuel tank for vehicle 126, the insertion hole 145 is a screw hole, and the open-close lid 146 is a bolt to be screw-engaged with the insertion hole 145. This ensures that generation of noise due to repeated opening and closing of the open-close lid 146 can be prevented from occurring because of vibrations during running of the vehicle. Besides, the configuration in which the insertion hole 145 and the open-close lid 146 are provided below the gun stopper 43 ensures that when the fuel gun is inserted into the fuel supply port device 140, the fuel gun is prevented from making contact with the open-close lid 146 to loosen the open-close lid 146.

In addition, in the fuel tank for vehicle 126, at least a part of the insertion hole 145 is provided at such a position as to overlap with the fuel supply port 34 and to avoid the gun stopper 43, as viewed in the axial direction of the fuel supply port 34. This configuration ensures that an operation of bringing the attaching/detaching tool T1 inserted via the fuel supply port 34 to the insertion hole 145 and an operation of inserting the fuel-extracting tool such as a hose H into the insertion hole 145 are facilitated, and the workability in extracting the fuel can be enhanced.

Besides, in the fuel tank for vehicle 126, the communication holes 42f which are smaller than the insertion hole 145 in diameter and which permit both flow of the fuel from the inside of the fuel supply port device 140 to the inside of the tank 31 and discharge of air present in the tank body 31 are provided in the peripheral wall part 42a and the cap member 44. This ensures that both flow of the fuel into the tank body 31 and discharge of air present in the tank body 31 can be performed smoothly.

Incidentally, a configuration may also be adopted in which, for example, the insertion hole 145 is a predetermined engaging hole, and a cap member to be detachably engaged with the insertion hole 145 to close the insertion hole 145 is provided as the open-close lid 146.

Fourth Embodiment

Now, a fourth embodiment of the present invention will be described below referring to FIG. 7 while referring also to FIGS. 1 to 3.

This embodiment differs from the above-described first embodiment particularly in that an open-close lid 246 for opening and closing the lower opening 42e of the peripheral wall part 42a is supported on a cap member 44 in a vertically movable manner and is biased in the direction for closing the lower opening 42e of the peripheral wall part 42a and, hence, closing the insertion hole 45. The other parts which are the same as those in the first embodiment above are denoted by the same reference symbols as used above, and descriptions of the other parts will be omitted.

Figure 7A:
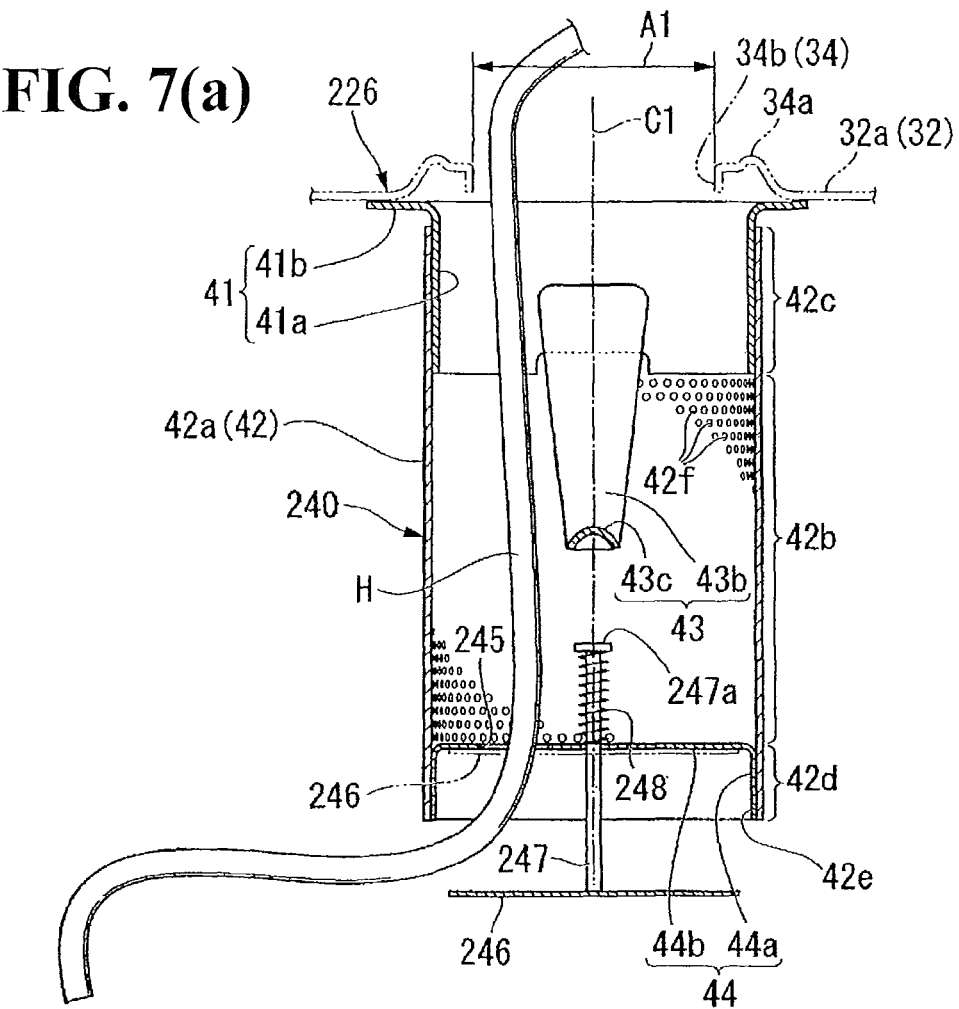
FIG. 7(a) is a sectional view, corresponding to FIG. 4, in a fourth embodiment of the invention.
Figure 7B:
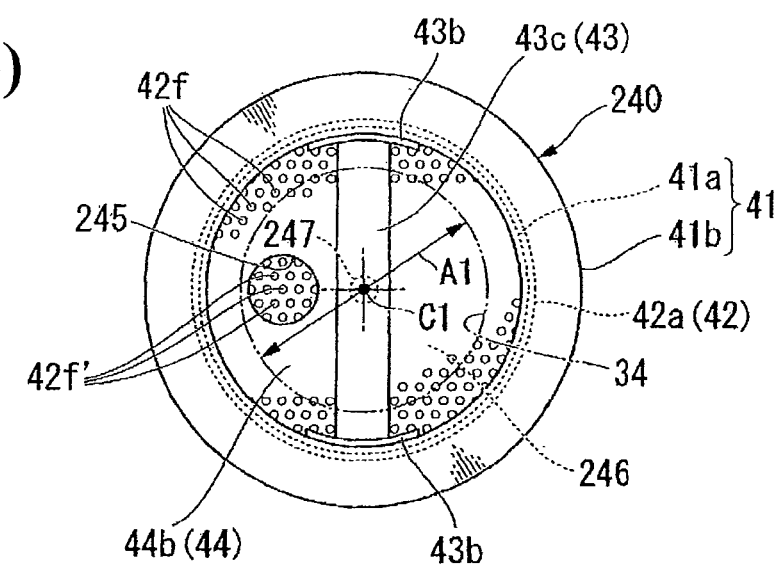
FIG. 7(b) is a top plan view of a fuel supply port device shown in FIG. 7(a)

In a fuel supply port device 240 shown in FIG. 7, the open-close lid 246 is in the shape of a flat plate which is substantially orthogonal to the fuel supply port axis C1 and which is in mesh form provided with a multiplicity of small holes (communication holes 42f), like the above-mentioned mesh part 42b and bottom wall part 44b. A slide rod 247 extending along the fuel supply port axis C1 is erectly provided at the center of an upper surface of the open-close lid 246. The slide rod 247 penetrates a bottom wall part 44b of the cap member 44 from below, and a helical compression spring 248 is provided in a contracted state between a retainer 247a attached to the upper end of the slide rod 247 and the bottom wall part 44b. This ensures that the open-close lid 246 is biased in the direction (upward direction) for closing the lower opening 42e of the peripheral wall part 42a (and the insertion hole 45).

Specifically, even in the case where the insertion hole 45 for only inserting the fuel-extracting tool such as a hose H is provided in the cap member 44 and, hence, in the fuel supply port device 240, the function of the fuel supply port device 240 equipped with the flame arrester 42 can be obtained in the same manner as before, since the open-close liquid 246 is normally in the closed state.

On the other hand, at the time of performing an operation of extracting the fuel present in the tank body 31 by use of the fuel-extracting tool such as a hose H, the hose H inserted via the fuel supply port 34 into the fuel supply port device 240 is further inserted into the insertion hole 45, and the open-close lid 246 is pushed by the tip of the hose H, to push the open-close lid 246 downward (in the opening direction) against the biasing force of the helical compression spring 248, whereby the hose H can be brought to the outside of the fuel supply port device 240 (to the inside of the tank body 31) while opening the insertion hole 45 in the cap member 44. In addition, after the fuel in the tank body 31 is extracted through the hose H, the insertion hole 45 of the cap member 44 can be closed with the open-close lid 246 and an initial condition can be recovered, by only withdrawing the hose H upward.

Incidentally, for example, a configuration in which the open-close lid 246 is biased in the closing direction by any of various elastic members provided in place of the helical compression spring 248, a configuration in which the open-close lid 246 is supported on a slide rod 247 extending from the side of the flame arrester 42, or a configuration in which the open-close lid 246 covers a part of the lower opening 42e, may also be adopted.

As has been described above, in the fuel tank for vehicle 226 equipped with the fuel supply port device 240 in this embodiment, like in the above-described first embodiment, the fuel supply port device 240 is provided with the insertion hole 45 for offering communication between the inside of the fuel supply port device 240 and the inside of the tank body 31 and for inserting the fuel-extracting tool (hose H) therethrough, and with the open-close lid 246 for opening and closing the insertion hole 45. This configuration ensures that the fuel in the tank body 31 can be extracted by inserting the fuel-extracting tool such as the hose H into the fuel supply port device 240 via the fuel supply port 34. Consequently, the fuel tank 226 can be prevented from being enlarged in size, and the function of the fuel supply port device 240 equipped with the flame arrester 42 can be obtained in the same manner as before.

In addition, in the fuel tank for vehicle 226, the insertion hole 45 and the open-close lid 246 are provided below the gun stopper 43. This ensures that when the fuel gun is inserted into the fuel supply port device 240, the fuel gun can be prevented from making contact with the open-close lid 246 to open the open-close lid 246.

Besides, in the fuel tank for vehicle 226, at least a part of the insertion hole 45 is provided at such a position as to overlap with the fuel supply port 34 and to avoid the gun stopper 43, as viewed in the axial direction of the fuel supply port 34. This ensures that an operation by which the fuel-extracting tool such as a hose H inserted via the fuel supply port 34 is inserted into the insertion hole 45 can be carried out easily, and the workability in extracting the fuel can be enhanced.

In addition, in the fuel tank for vehicle 226, the open-close lid 246 is normally biased in the direction for closing the insertion hole 45 by the helical compression spring 248. This ensures that at the time of putting the fuel-extracting tool such as a hose H into and out of the insertion hole 45, it is unnecessary to separately perform an operation of opening and closing the open-close lid 246, and the workability in extracting the fuel can be enhanced.

Besides, in the fuel tank for vehicle 226, the communication holes 42f which are smaller than the insertion hole 45 in diameter and which permit both flow of the fuel from the inside of the fuel supply port device 240 to the inside of the tank body 31 and discharge of air present in the tank body 31 are provided in the peripheral wall part 42a and the cap member 44. This ensures that both flow of the fuel into the tank body 31 and discharge of air present in the tank body 31 can be performed smoothly.

Fifth Embodiment

Now, a fifth embodiment of the present invention will be described below referring to FIG. 8 while referring also to FIGS. 1 to 3.

This embodiment differs from the above-described first embodiment particularly in that an open-close lid 246 for opening and closing the lower opening 42e of the above-mentioned peripheral wall part 42a is supported on a flame arrester 42 through a screw shaft 347 and a nut member 347a in a vertically movable manner. The other parts which are the same as those in the above-described first embodiment are denoted by the same reference symbols as used above, and descriptions of the other parts will be omitted.

Figure 8A:
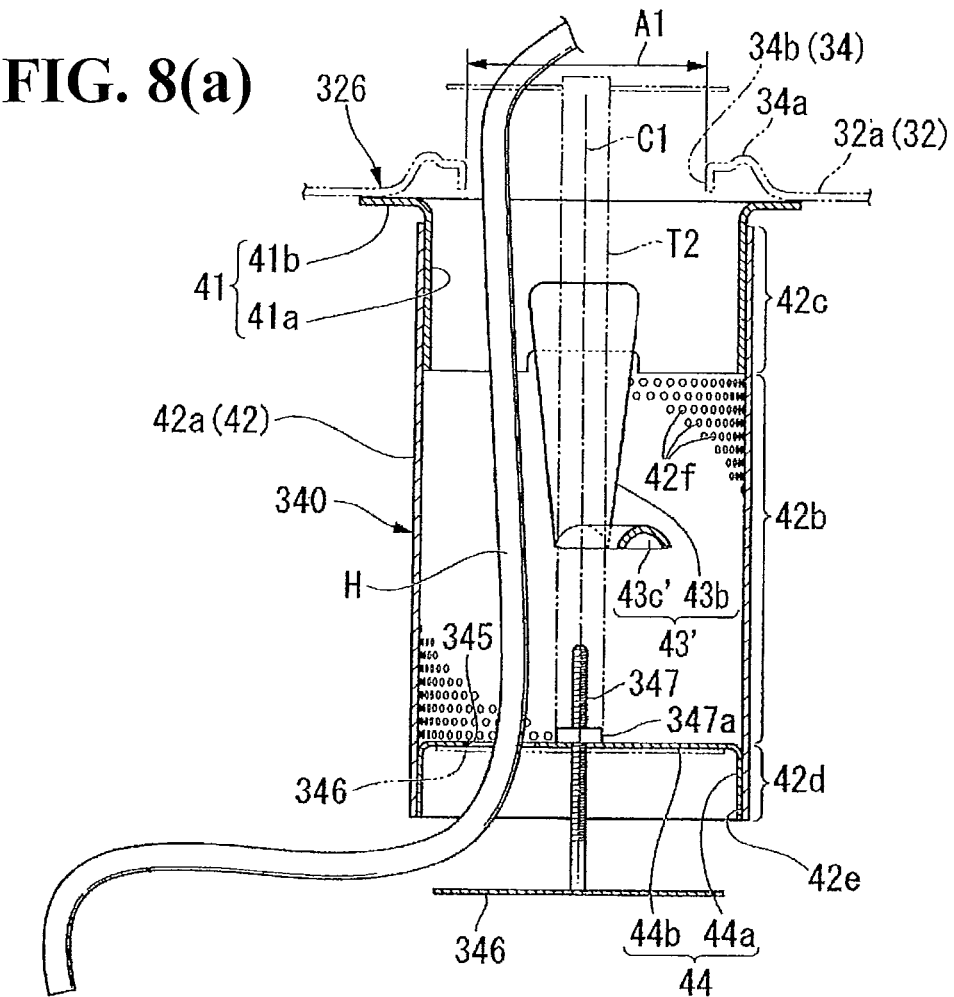
FIG. 8(a) is a sectional view, corresponding to FIG. 4, in a fifth embodiment of the invention.
Figure 8B:
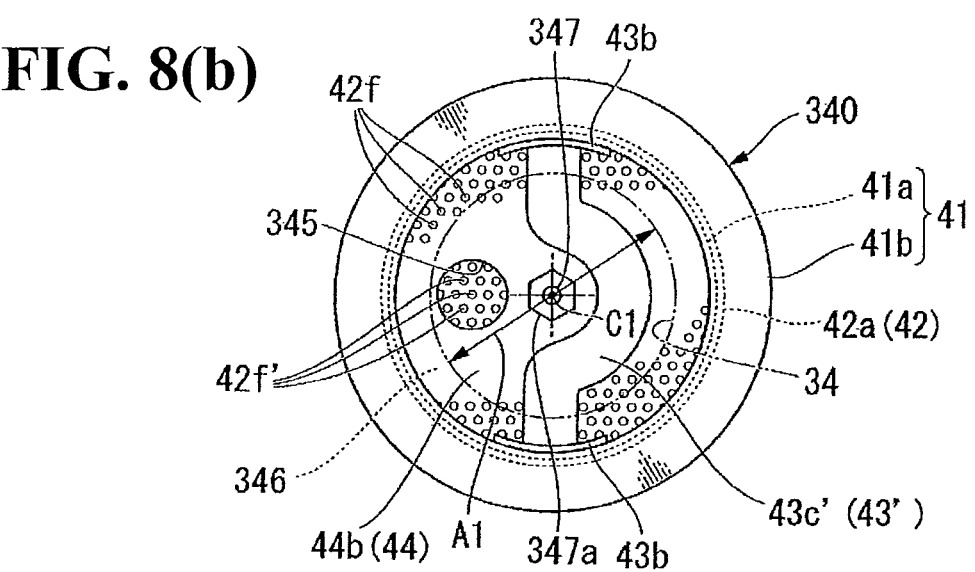
FIG. 8(b) is a top plan view of a fuel supply port device shown in FIG. 8(a)

In a fuel supply port device 340 shown in FIG. 8, the screw shaft 347 extending along the fuel supply port axis C1 is erectly provided at the center of an upper surface of the open-close lid 246. The screw shaft 347 penetrates a bottom wall part 44b of a cap member 44 from below, and is screw-engaged with the nut member 347a supported on the upper surface of the bottom wall part 44b. Consequently, with the screw shaft 347 or the nut member 347a turned to change the screw engagement position of them, the open-close lid 246 is moved vertically, to open or close the lower opening 42e of the peripheral wall part 42a and, hence, the insertion hole 45.

Specifically, even in the case where the insertion hole 45 for only inserting the fuel-extracting tool such as a hose H therethrough is provided in the cap member 44 and, hence, in the fuel supply port device 340, the function of the fuel supply port device 340 equipped with the flame arrester 42 can be obtained in the same manner as before, by normally keeping the open-close lid 246 in the closed state.

On the other hand, at the time of performing an operation of extracting the fuel present in the tank body 31 by use of the fuel-extracting tool such as the hose H, the screw shaft 347 or the nut member 347a is turned by use of an attaching/detaching tool T2 to put the open-close lid 246 into an open state, and the hose H inserted via the fuel supply port into the fuel supply port device 340 is further inserted into the insertion hole 45, whereby the hose H can be brought to the outside of the fuel supply port device 340 (the inside of the tank body 31). Besides, after the fuel in the tank body 31 is extracted through the hose H, it suffices to withdraw the hose H upward and to turn the screw shaft 347 or the nut member 347a by use of the attaching/detaching tool T2, thereby putting the open-close lid 246 into the closed state.

Incidentally, a gun stopper 43' in this embodiment differs from the above-mentioned gun stopper 43 in that it is provided with a bridge part 43c' curved so as to avoid the above-mentioned attaching/detaching tool T2. This configuration, however, is not limitative. Specifically, a gun stopper which avoids the screw shaft 347 and the nut member 347a and the insertion hole 45 may be used, or, alternatively, the screw shaft 347 and the nut member 347a and the insertion hole 45 may be so disposed as to avoid the gun stopper. Besides, a configuration in which the screw shaft 347 is provided on the side of the flame arrester 42 and the nut member 347a is provided on the open-close lid 246, or a configuration in which a part of a mesh place covering the whole part of the lower opening 42e constitutes the open-close lid 246, may also be adopted.

As has been described above, in the fuel tank for vehicle 326 equipped with the fuel supply port device 340 in this embodiment, like in the above-described first embodiment, the fuel supply port device 340 is provided with the insertion hole 45 for offering communication between the inside of the fuel supply port device 340 and the inside of the tank body 31 and for inserting the fuel-extracting tool (hose H), and with the open-close lid 246 for opening and closing the insertion hole 45. This configuration ensures that the fuel in the tank body 31 can be extracted by inserting the fuel-extracting tool such as the hose H into the fuel supply port device 340 via the fuel supply port 34. Consequently, the fuel tank 326 can be prevented from being enlarged in size, and the function of the fuel supply port device 340 equipped with the flame arrester 42 can be obtained in the same manner as before.

Besides, in the fuel tank for vehicle 326, the open-close lid 246 is provided with the screw shaft 347. This ensures that opening and closing of the open-close lid 246 are effected by changing the screw engagement position between the screw shaft 347 and the nut member 347a screw-engaged therewith, whereby generation of noise due to repeated opening and closing of the open-close lid 246 can be prevented from occurring because of vibrations during running of the vehicle. In addition, the configuration in which the screw shaft 347 and the nut member 347a are provided below the gun stopper 43 ensures that when the fuel gun is inserted into the fuel supply port device 340, the fuel gun can be prevented from making contact with the screw shaft 347 and the nut member 347a to result in opening of the open-close lid 246.

In addition, in the fuel tank for vehicle 326, at least a part of the insertion hole 45 is provided at such a position as to overlap with the fuel supply port 34 and to avoid the gun stopper 43, as viewed in the axial direction of the fuel supply port 34. This ensures that an operation by which the attaching/detaching tool T2 inserted via the fuel supply port 34 is brought to the screw shaft 347 or the nut member 347a and an operation of inserting the fuel-extracting tool such as a hose H are facilitated, and the workability in extracting the fuel can be enhanced.

Besides, in the fuel tank for vehicle 326, the communication holes 42f which are smaller than the insertion hole 45 in diameter and which permit both flow of the fuel from the inside of the fuel supply port device 340 to the inside of the tank body 31 and discharge of air present in the tank body are provided in the peripheral wall part 42a and the cap member 44. This ensures that both flow of the fuel into the tank body 31 and discharge of air present in the tank body 31 can be performed smoothly.

Sixth Embodiment

Now, a sixth embodiment of the present invention will be described below referring to FIG. 9 while referring also to FIGS. 1 to 3.

This embodiment differs from the above-described first embodiment particularly in that a lower opening 42e of a peripheral wall part 42a is an insertion hole 445 through which to insert a fuel-extracting tool (hose H), and a cap member 444 covering the lower opening 42e is an open-close lid 446. The other parts which are the same as those in the above-described first embodiment are denoted by the same symbols as used above, and descriptions of the other parts will be omitted.

Figure 9A:
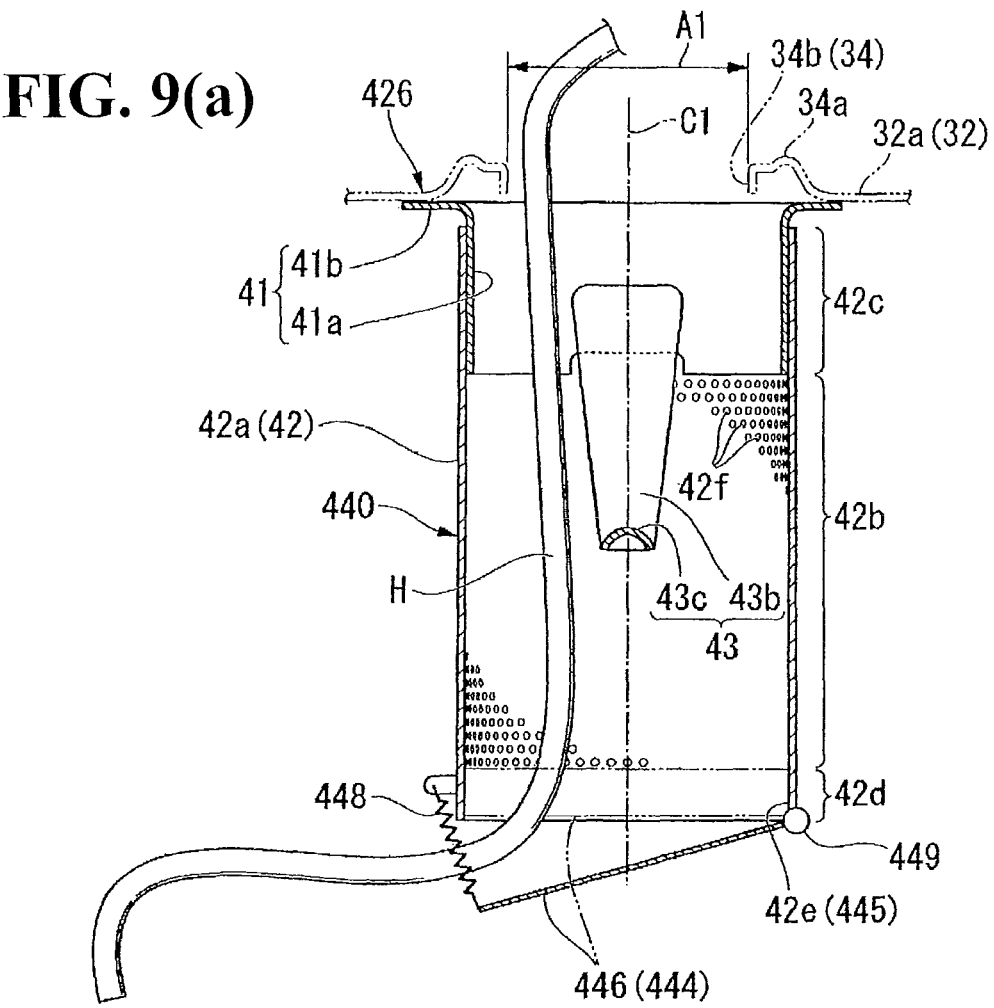
FIG. 9(a) is a sectional view, corresponding to FIG. 4, in a sixth embodiment of the invention.
Figure 9B:
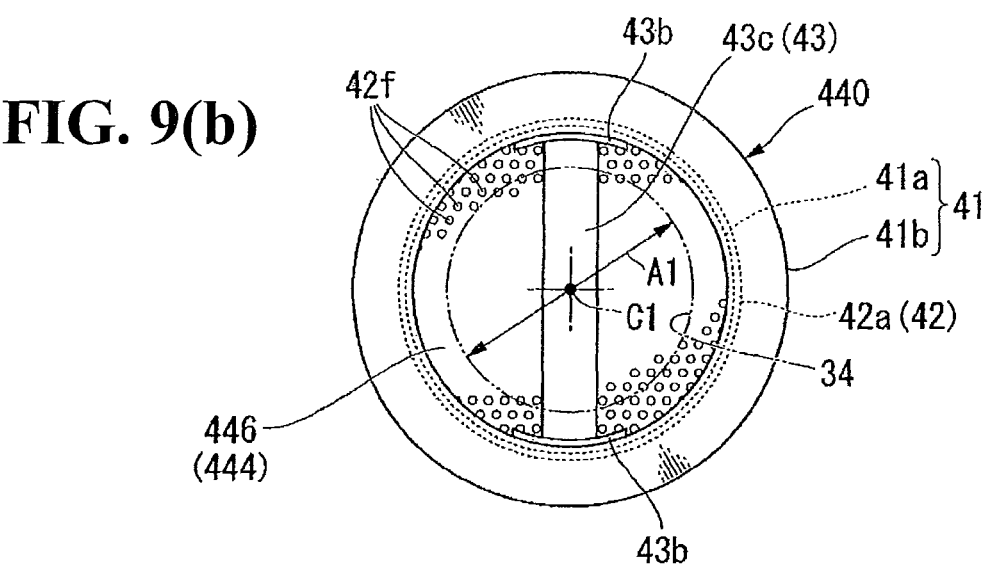
FIG. 9(b) is a top plan view of a fuel supply port device shown in FIG. 9(b)

In a fuel supply port device 440 shown in FIG. 9, the cap member 444 (open-close lid 446) is in the shape of a flat plate substantially orthogonal to the fuel supply port axis C1, and is in mesh form provided with a multiplicity of small holes (communication holes 42f), like the above-mentioned mesh part 42b and bottom wall part 44b. One end of the cap member 444 is supported on one side of the lower opening 42e of the peripheral wall part 42a in an openable and closable manner, through a hinge shaft 449 orthogonal to the fuel supply port axis C1. The cap member 444 is biased in the direction for closing the lower opening 42e of the peripheral wall part 42a (the insertion hole 445) by, for example, a helical tension spring 448 disposed at the outer circumference of a lower portion of the peripheral wall part 42a.

Specifically, the lower opening 42e of the peripheral wall part 42a of a flame arrester 42 (the insertion hole 445) is normally closed with the cap member 444 (open-close lid 446) being in the closed state, so that the function of the fuel supply port device 440 equipped with the flame arrester 42 can be obtained in the same manner as before, Incidentally, a configuration in which the cap member 444 (open-close lid 446) is biased in the closing direction by a torsion spring or a leaf spring or the like provided in place of the helical tension spring 448. In addition, a part of the cap member 444 may be an open-close lid 446 for opening and closing a part of the lower opening 42e (insertion hole 445).

On the other hand, at the time of performing an operation of extracting the fuel present in the tank body 31 by use of a fuel-extracting tool such as a hose H, the cap member 444 (open-close lid 446) is pushed by the tip of the hose H inserted into the fuel supply port device 440 via the fuel supply port 34, to push open the cap member 444 (open-close lid 446) downward (in the opening direction) against the biasing force of the helical tension spring 448, whereby the hose H can be brought to the outside of the fuel supply port device 440 (the inside of the tank body 31) while opening the lower opening 42e of the peripheral wall part 42a (the insertion hole 445). In addition, after the fuel in the tank body 31 is extracted through the hose H, the insertion hole 445 can be closed with the open-close lid 446 and an initial condition can be recovered, by only withdrawing the hose H upward from the lower opening 42e (insertion hole 445).

As has been described above, in the fuel tank for vehicle 426 equipped with the fuel supply port device 440 in this embodiment, like in the above-described first embodiment, the fuel supply port device 440 is provided with the insertion hole 445 for offering communication between the inside of the fuel supply port device 440 and the inside of the tank body 31 and for inserting the fuel-extracting tool (hose H), and with the open-close lid 446 for opening and closing the insertion hole 445. This ensures that the fuel in the tank body 31 can be extracted by inserting the fuel-extracting tool such as the hose H into the fuel supply port device 440 via the fuel supply port 34. Consequently, the fuel tank 440 can be prevented from being enlarged in size, and the function of the fuel supply port device 440 equipped with the flame arrester 42 can be obtained in the same manner as before.

In addition, in the fuel tank for vehicle 426, the insertion hole 445 and the open-close lid 446 are provided below the gun stopper 43. This ensures that when the fuel gun is inserted into the fuel supply port device 440, the fuel gun can be prevented from making contact with the open-close lid 446 to open the open-close lid 446.

Besides, in the fuel tank for vehicle 426, at least a part of the insertion hole 445 is provided at such a position as to overlap with the fuel supply port 34 and to avoid the gun stopper 43, as viewed in the axial direction of the fuel supply port 34. This configuration ensures that an operation by which the fuel-extracting tool such as the hose H inserted via the fuel supply port 34 is inserted into the insertion hole 445 is facilitated, and the workability in extracting the fuel can be enhanced.

In addition, in the fuel tank for vehicle 426, the open-close lid 446 is normally biased in the direction for closing the insertion hole 445 by the helical tension spring 448. This ensures that at the time of putting the fuel-extracting tool such as the hose H into and out of the insertion hole 445, it is unnecessary to separately carry out an operation of opening and closing the open-close lid 446, and the workability in extracting the fuel can be enhanced.

Besides, in the fuel tank for vehicle 426, the communication holes 42f which are smaller than the insertion hole 445 in diameter and which permit both flow of the fuel from the inside of the fuel supply port device 440 to the inside of the tank body 31 and discharge of air present in the tank body 31 are provided in the peripheral wall part 42a and the cap member 444 (open-close lid 446). This ensures that both flow of the fuel into the tank body 31 and discharge of air present in the tank body 31 can be performed smoothly.

Seventh Embodiment

Now, a seventh embodiment of the present invention will be described below referring to FIG. 10 while referring also to FIGS. 1 to 3.

This embodiment differs from the above-described first embodiment particularly in that a lower opening 42e of a peripheral wall part 42a is made to be an insertion hole 545 though which to insert a fuel-extracting tool (hose H), and a cap member 544 for covering the lower opening 42e is bisected to form a pair of open-close lids 546. The other parts which are the same as those in the above-described first embodiment are denoted by the same reference symbols used above, and descriptions of the other parts will be omitted.

Figure 10A:
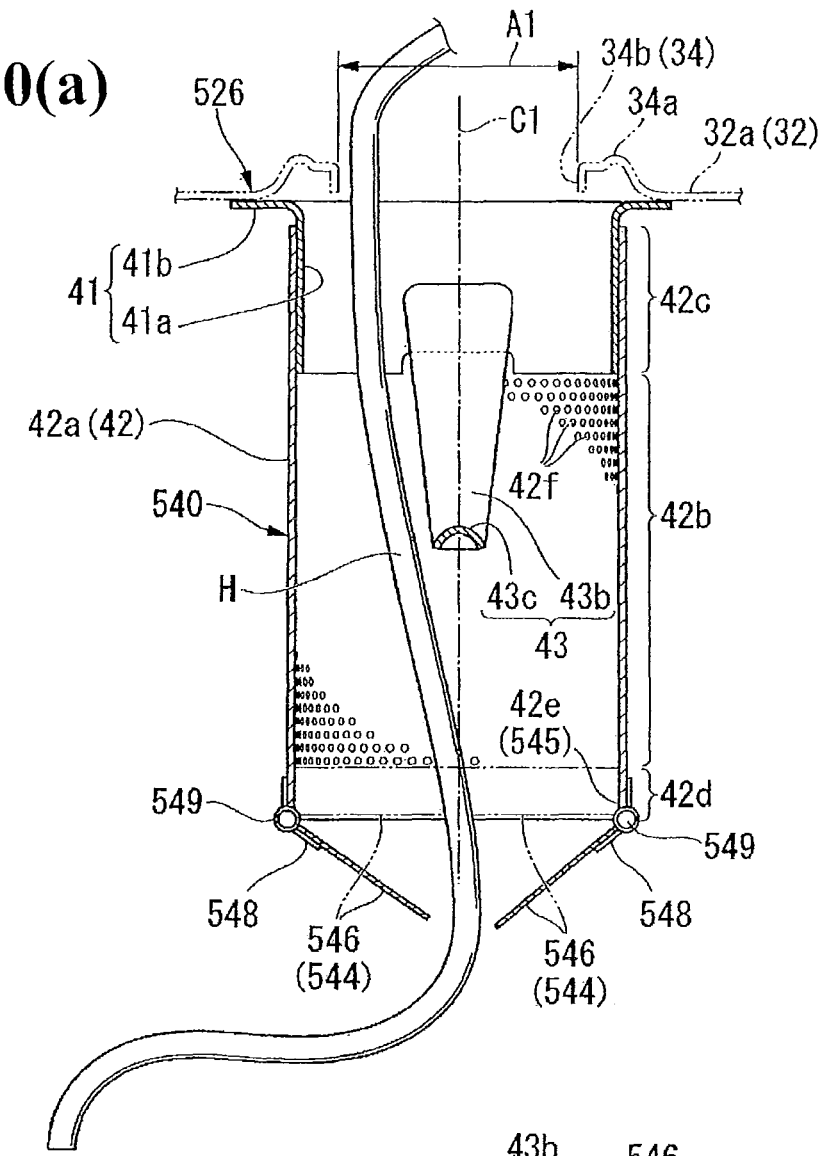
FIG. 10(a) is a sectional view, corresponding to FIG. 4, in a seventh embodiment of the invention.
Figure 10B:
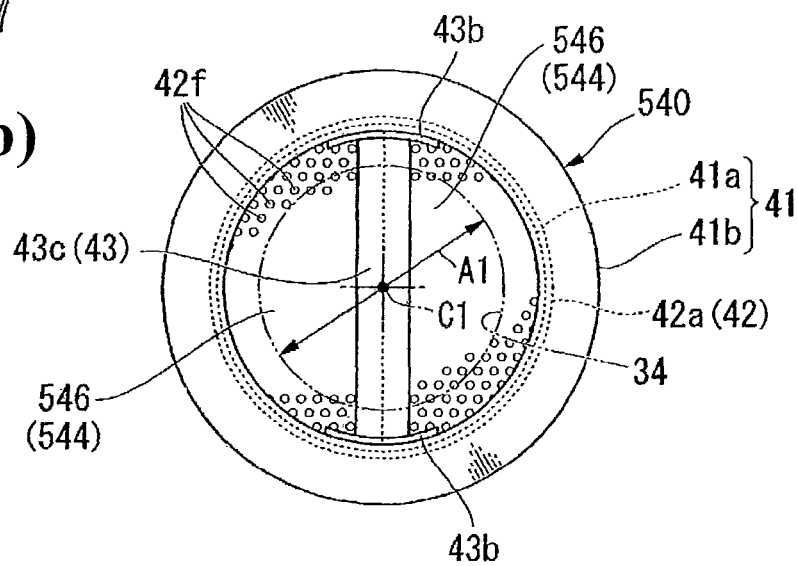
FIG. 10(b) is a top plan view of a fuel supply port device shown in FIG. 10(a)

In a fuel supply port device 540 shown in FIG. 10, the cap member 544 is in the shape of a flat plate substantially orthogonal to the fuel supply port axis C1, and is in mesh form provided with a multiplicity of small holes (communication holes 43f), like the above-mentioned mesh part 42b and bottom wall part 44b. The cap member 544 is bisected, for example, along a radial direction into a pair of halves, which constitute the pair of open-close lids 546. One end of each of the open-close lids 546 is supported on one side of the lower opening 42e of the peripheral wall part 42a in an openable and closable manner, through a hinge shaft 549 orthogonal to the fuel supply port axis C1. Each of the open-close lids 546 is biased in the direction for closing the lower opening 42e of the peripheral wall part 42a (the insertion hole 545) by, for example, a helical torsion spring 548 through which the hinge shaft 549 is passed.

Specifically, the lower opening 42e of the peripheral wall part 42a of the flame arrester 42 (the insertion hole 545) is normally closed with the cap member 544 (the open-close lids 546) being in the closed state, so that the function of the fuel supply port device 540 equipped with the flame arrester 42 can be obtained in the same manner as before. Incidentally, a configuration may be adopted in which the cap member 544 (the open-close lids 546) is biased in the closing direction by any of various elastic members provided in place of the helical torsion springs 48. In addition, a configuration may also be adopted in which one of the open-close lids 546 is fixed to the lower opening 42e, and only the other of the open-close lids 546 is used to open and close the insertion hole 545.

On the other hand, at the time of performing an operation of extracting the fuel present in the tank body 31 by use of a fuel-extracting tool such as a hose H, the open-close lids 546 are pushed by the tip of the hose H inserted into the fuel supply port device 540 via the fuel supply port 34, and they are pushed open downward (in the opening direction) against the biasing forces of the helical torsion springs 548, whereby the lower opening 42e of the peripheral wall part 42a (the insertion hole 545) can be opened, and the hose H can be brought to the outside of the fuel supply port device 540 (the inside of the tank body 31). In addition, after the fuel in the tank body 31 is extracted through the hose H, the insertion hole 545 can be closed with the open-close lids 546 and an initial condition can be recovered, by only withdrawing the hose H upward from the lower opening 42e (the insertion hole 545).

As has been described above, in the fuel tank for vehicle 526 equipped with the fuel supply port device 540 in this embodiment, like in the above-described first embodiment, the fuel supply port device 540 is provided with the insertion hole 545 for offering communication between the inside of the fuel supply port device 540 and the inside of the tank body 31 and for inserting the fuel-extracting tool, and with the open-close lids 546 for opening and closing the insertion hole 545. This ensures that the fuel in the tank body 31 can be extracted by inserting the fuel-extracting tool such as the hose H into the fuel supply port device 540 via the fuel supply port 34. Accordingly, the fuel tank 540 can be prevented from being enlarged in size, and the function of the fuel supply port device 540 equipped with the flame arrester 42 can be obtained in the same manner as before.

In addition, in the fuel tank for vehicle 526, the insertion hole 545 and the open-close lids 546 are provided below the above-mentioned gun stopper 43. This ensures that when a fuel gun is inserted into the fuel supply port device 540, the fuel gun can be prevented from making contact with the open-close lids 546 to open the open-close lids 546.

Besides, in the fuel tank for vehicle 526, at least a part of the insertion hole 545 is provided at such a position as to overlap with the fuel supply port 34 and to avoid the gun stopper 43, as viewed in the axial direction of the fuel supply port 34. This ensures that an operation by which the fuel-extracting tool such as the hose H inserted via the fuel supply port 34 is inserted into the insertion hole 545 is facilitated, and the workability in extracting the fuel can be enhanced.

In addition, in the fuel tank for vehicle 526, the open-close lids 546 are normally biased in the directions for closing the insertion hole 545 by the helical torsion springs 548. This ensures that at the time of putting the fuel-extracting tool such as the hose H into and out of the insertion hole 545, it is unnecessary to separately perform an operation of opening and closing the open-close lids 546, and the workability in extracting the fuel can be enhanced.

Besides, in the fuel tank for vehicle 526, communication holes 42f which are smaller than the insertion hole 545 in diameter and which permit both flow of the fuel from the inside of the fuel supply port device 540 to the inside of the tank body 31 and discharge of air present in the tank body 31 are provided in the peripheral wall part 42a and in the cap member 544 (the open-close lids 546). This configuration ensures that both flow of the fuel into the tank body 31 and discharge of air present in the tank body 31 can be performed smoothly.

Eighth Embodiment

Now, an eighth embodiment of the present invention will be described below referring to FIG. 11 while referring also to FIGS. 1 to 3.

This embodiment differs from the above-described first embodiment particularly in that an insertion hole 645 through which to insert a fuel-extracting tool (hose H) and an open-close lid 646 for opening and closing the insertion hole 645 are provided in the above-mentioned fuel supply guide tube 41. The other parts which are the same as those in the above-described first embodiment are denoted by the same reference symbols as used above, and descriptions of the other parts will be omitted.

Figure 11:
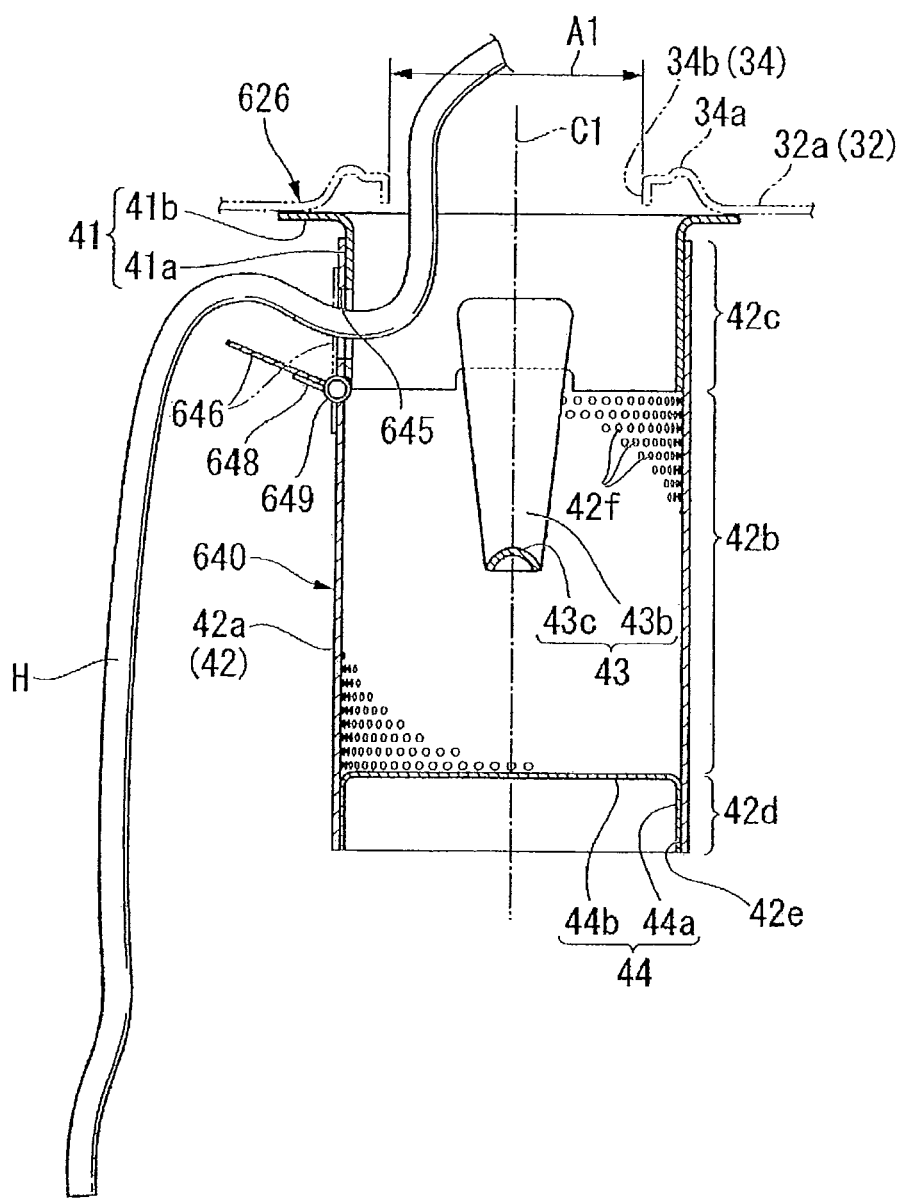
FIG. 11 is a sectional view, corresponding to FIG. 4, in an eighth embodiment of the invention.

In a fuel supply port device 640 shown in FIG. 11, the insertion hole 645 is, for example, circular in side view, and is so provided as to radially penetrate a peripheral wall part 42a of a flame arrester 42 together with a peripheral wall part 41a of the fuel supply guide tube 41. On the other hand, the open-close lid 646 is configured, for example, to cover the insertion hole 645 from the outer circumference side of the fuel supply port device 640. The lower end of the open-close lid 646 is supported on the peripheral wall part 42a of the flame arrester 42 in an openable and closable manner, through a hinge shaft 649 orthogonal to the fuel supply port axis C1.

The open-close lid 646 is biased in the direction for closing the insertion hole 645 by, for example, a helical torsion spring 648 through which the hinge pin 649 is passed. Specifically, even in the case where the insertion hole 645 for only inserting the fuel-extracting tool such as a hose H is provided in the fuel supply port device 640, the function of the fuel supply port device 640 equipped with the flame arrester 42 can be obtained in the same manner as before, since the open-close lid 646 is normally in the closed state. Incidentally, a configuration may be adopted in which the open-close lid 646 is biased in the closing direction by any of various elastic members provided in place of the helical torsion spring 648. In addition, the open-close lid 646 may be or may not be in mesh form.

On the other hand, at the time of performing an operation of extracting the fuel present in the tank body 31 by use of a fuel-extracting tool such as a hose H, the open-close lid 646 is pushed by the tip of the hose H inserted into the fuel supply guide tube 41 via the fuel supply port 34, and the open-close lid 646 is pushed open to the outer circumference side (in the opening direction) against the biasing force of the helical torsion spring 648, whereby the insertion 645 in the side portion of the fuel supply guide tube 41 can be opened, and the hose H can be brought to the outside of the fuel supply port device 640 (the inside of the tank body 31). In addition, after the fuel in the tank body 31 is extracted through the hose H, the insertion hole 645 in the side portion of the fuel supply port device 640 can be closed with the open-close lid 646 and an initial condition can be recovered, by only withdrawing the hose H from the insertion hole 645.

As has been described above, in the fuel tank for vehicle 626 equipped with the fuel supply port device 640 in this embodiment, like in the above-described first embodiment, the fuel supply port device 640 is provided with the insertion hole 645 for offering communication between the inside of the fuel supply port device 640 and the inside of the tank body 31 and for inserting the fuel-extracting tool (hose H), and the open-close lid 646 for opening and closing the insertion hole 645. This configuration ensures that the fuel in the tank body 31 can be extracted by inserting the fuel-extracting tool such as the hose H into the fuel supply port device 640 via the fuel supply port 34. Accordingly, the fuel tank 626 can be prevented from being enlarged in size, and the function of the fuel supply port device 640 equipped with the flame arrester 42 can be obtained in the same manner as before.

In addition, in the fuel tank for vehicle 626, the insertion hole 645 and the open-close lid 646 are provided below the fuel supply guide tube 41. This ensures that the insertion hole 645 and the open-close lid 646 can be laid out near the fuel supply port 34. Consequently, insertion of the fuel-extracting tool such as the hose H into the tank body 31 is facilitated, and the workability in extracting the fuel can be enhanced.

Besides, in the fuel tank for vehicle 626, the open-close lid 646 is normally biased in the direction for closing the insertion hole 645 by the helical torsion spring 648. This ensures that at the time of putting the fuel-extracting tool such as the hose H into and out of the insertion hole 645, it is unnecessary to separately perform an operation of opening and closing the open-close lid 646, and the workability in extracting the fuel can be enhanced.

Ninth Embodiment

Now, a ninth embodiment of the present invention will be described below referring to FIGS. 12 to 16.

This embodiment differs from the above-described first embodiment particularly in that the invention is applied to a fuel tank 826 which is disposed on the front side of a seat of a motorcycle in the manner of straddling the vehicle body and which is clamped between the driver's knees and in that there is provided a flame arrester 142 which does not have a gun stopper and which has a taper part 142b. The other parts which are the same as those in the above-described first embodiments are denoted by the same reference symbols as used above, and descriptions of the other parts will be omitted.

Figure 12:
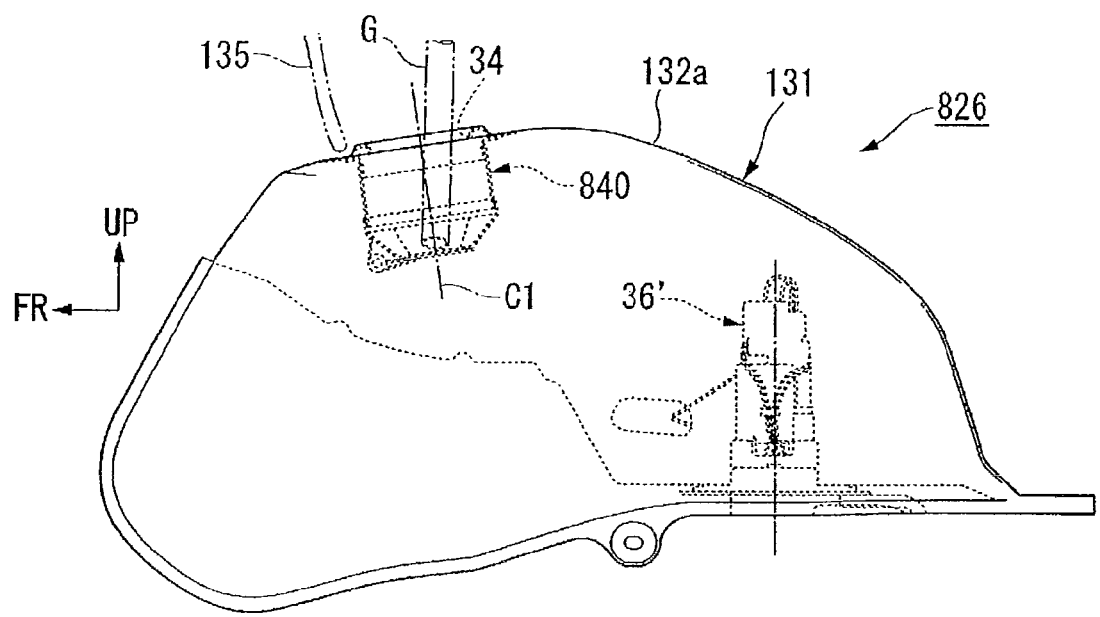
FIG. 12 is a left side view of a fuel tank in a ninth embodiment of the invention.
Figure 13:
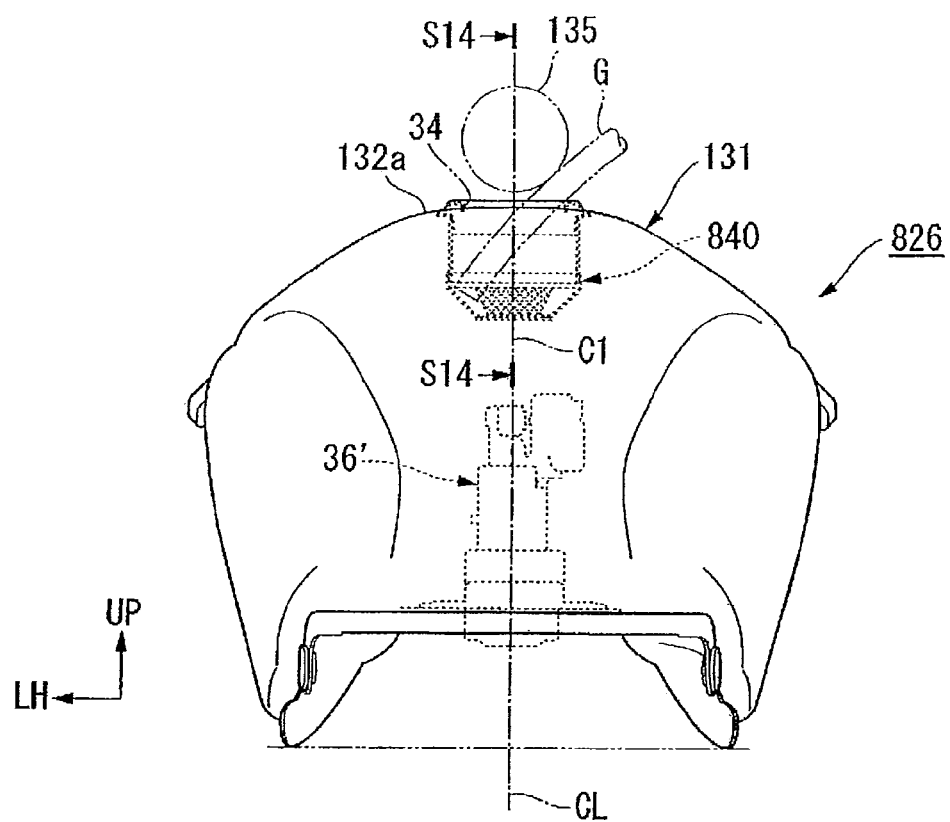
FIG. 13 is a rear view of the fuel tank of FIG. 12.

A fuel tank 826 shown in FIGS. 12 and 13 has a configuration in which a lower wall part of a front portion of a tank body 131 thereof is formed in a saddle-like shape so as to straddle a body frame (not shown) on the left and right sides and, on the other hand, a lower wall part of a rear portion of the tank body 131 is formed in a substantially horizontal flat shape. The tank body 131 is formed by integrally joining by welding a pair of inner and outer split bodies, which are press moldings of steel sheet. An upper wall part 132a of the tank body 131 is formed with the above-mentioned fuel supply port 34 on the front side, and a fuel supply port device 840 in this embodiment is provided on the lower side of the fuel supply port 34. Incidentally, symbol 36' in the figures denotes a fuel pump mounted to the lower wall part of the rear portion of the tank body 131.

Figure 14:
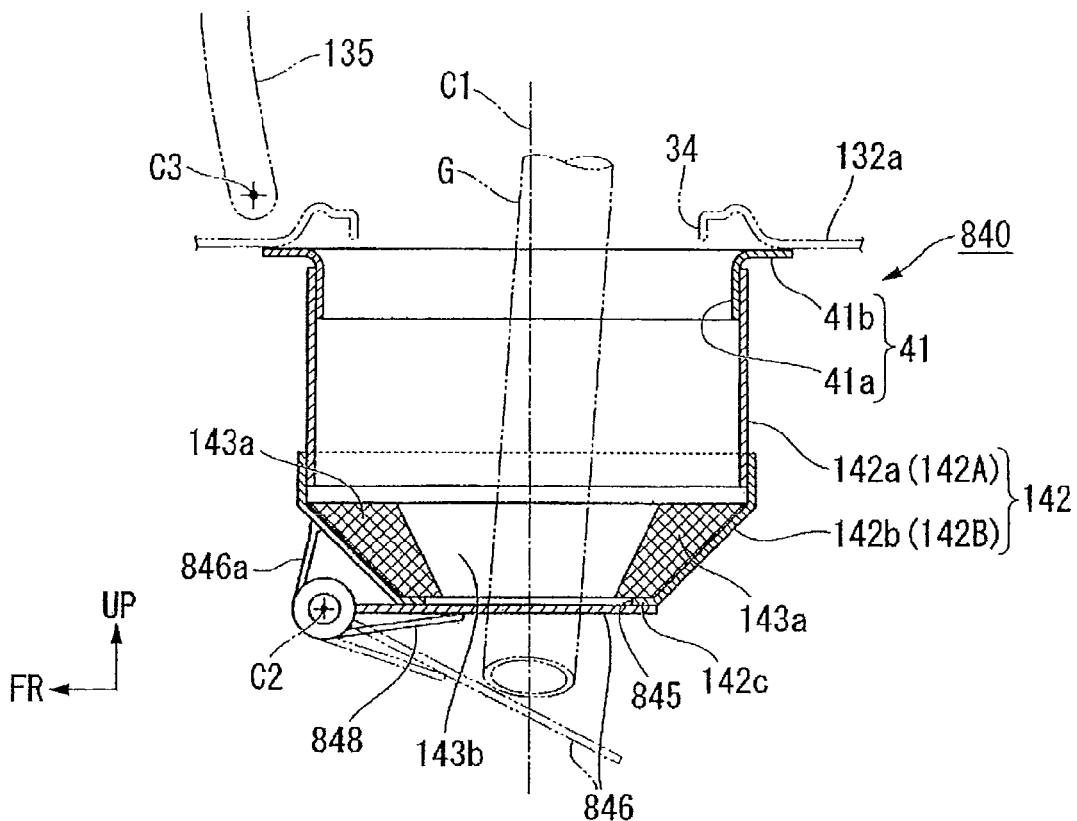
FIG. 14 is a sectional view taken along line S14-S14 of FIG. 13.
Figure 15:
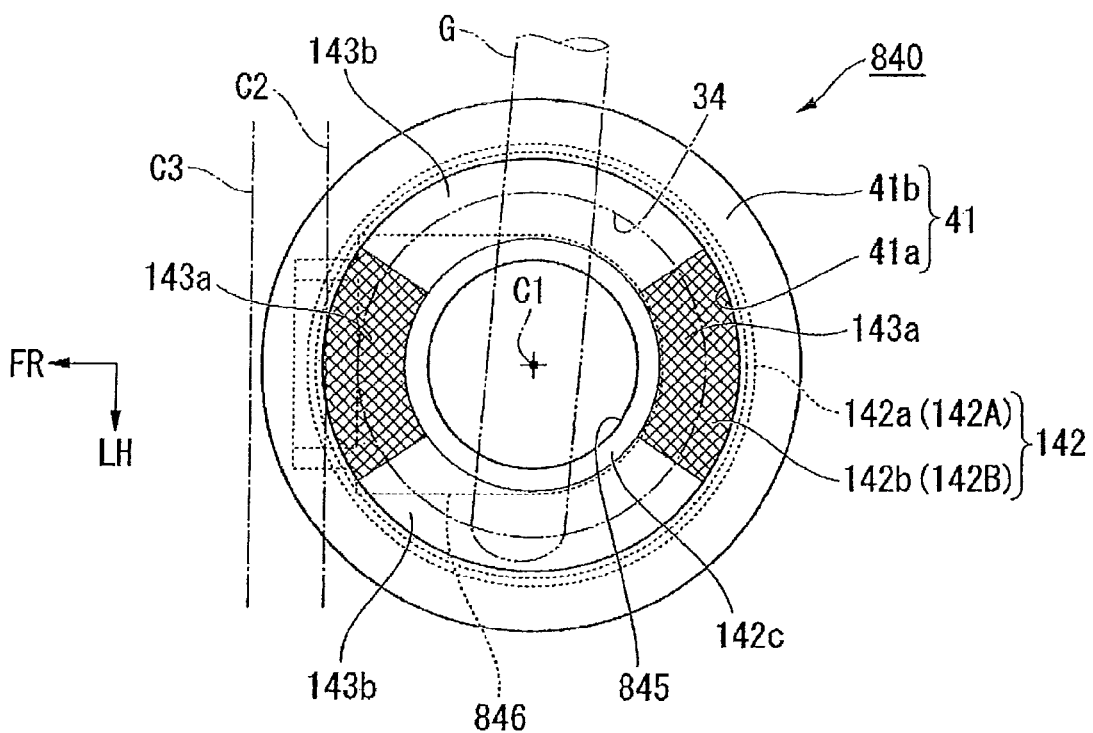
FIG. 15 is a top plan view of a fuel supply port device shown in FIG. 14.

Referring to FIGS. 14 and 15, the fuel supply port device 840 includes the fuel supply port 34, the above-mentioned fuel supply guide tube 41 continuous with and on the lower side of the fuel supply port 34 and extending into the tank body 131, a flame arrester 142 provided so as to cover a lower opening part of the fuel supply guide tube 41, and an open-close lid 846 provided so as to cover a lower end opening (hereafter referred to as the insertion hole 845) of the flame arrester 142. The insertion hole 845 through which the inside of the fuel supply port device 840 and the inside of the tank body 131 communicate with each other, whereby a fuel-extracting tool, such as a hose H, and a fuel gun (hereafter these will be generically referred to as the fuel gun or the like G) can be inserted into the tank body 131 through the fuel supply port 34.

The component parts of the fuel supply port device 840 such as the flame arrester 142, the open-close lid 846, etc. are formed, for example, from a plurality of kinds of metallic materials.

The flame arrester 142 has a cylindrical part 142a extending vertically in the manner of being coaxial with the axis line C1 of the fuel supply port 34, and a taper part 142b continuous with and on the lower side of the cylindrical part 142a and being in a tapered shape gradually reduced in diameter toward the lower side. The axis line C1 is also the axis line of the fuel supply port device 840.

An upper end portion of the cylindrical part 142a is fitted over the outer periphery of a peripheral wall part 41a of the fuel supply guide tube 41, and these are integrally joined by welding or the like. An inner flange part 142c in a flat plate-like shape substantially orthogonal to the axis line C1 is formed at the lower end of the taper part 142b, and the above-mentioned insertion hole 845 circular in top plan view is formed on the inner circumference side of the inner flange part 142c.

Since the flame arrester 142 has the taper part 142b, it is ensured that when the fuel gun or the like G is inserted into the fuel supply port device 840, the tip of the fuel gun or the like G makes sliding contact with the inner periphery of the taper part 142b to be guided toward the insertion hole 845, so that the fuel gun or the like G can be easily brought to the inside of the tank body 131.

The flame arrester 142 is composed of split members, namely, a cylindrical member 142A which forms the cylindrical part 142a and a taper member 142B which forms the taper part 142b and the inner flange part 142c on the lower end side of the cylindrical part 142a, and these members are integrally joined by welding or the like. Each of the members 142A and 142B is formed, for example, by forming steel sheet into a predetermined shape.

The cylindrical member 142A is in a porous form (mesh form) having a multiplicity of small holes (punching holes, communication holes 42f). On the other hand, the taper member 142B has porous mesh parts 143a having a multiplicity of small holes (communication holes 42f) similar to those in the cylindrical member 142A, and plate-like smooth parts (guide parts) 143b not having the small holes, wherein the mesh parts 143a and the smooth parts 143b are alternately arranged along the circumferential direction of the taper member 142B. In top plan view (a view along the axis line C1, an axial-direction view) of the taper member 142B, the mesh parts 143a are arranged in front and rear regions of the taper part 142b, while the smooth parts 143b are arranged in left and right regions of the taper part 142b. The mesh parts 143a and the smooth parts 143b are formed to be arranged substantially at regular intervals in the circumferential direction of a circle having its center on the axis line C1, in the taper member 142B.

A hinge bracket 846a is securely provided, for example, on the front end side of the taper part 142b, and the front end side of the open-close lid 846 is supported on the hinge bracket 846a so as to be turnable about an axis line C2 extending in the left-right direction. By the turning of the open-close lid 846, the insertion hole 845 can be opened and closed. The open-close lid 846 is in a flat plate-like shape substantially orthogonal to the axis line C1, for example, a smooth plate-like shape which, like the smooth parts 143b, does not have small holes. Incidentally, the open-close lid 846 may be in a mesh form having a multiplicity of small holes, like the mesh parts 143a.

The open-close lid 846 is biased in a direction for closing the insertion hole 845 from the lower side, by a helical torsion spring 848 through which a turning shaft is passed. In other words, the insertion hole 845 is normally closed with the open-close lid 846. Therefore, the function of the fuel supply port device 840 equipped with the flame arrester 142 can be obtained in the same manner as in the related art.

On the front end side of the fuel supply port 34, the front end side of a hinge-type tank cap 135 is supported on the tank body 131 or the fuel supply port device 840 so as to be turnable about an axis line C3 extending along the left-right direction. By the turning of the tank cap 135, the fuel supply port 34 can be opened and closed. Incidentally, the rear side of the tank cap 135 may be turnably supported on the rear end side of the fuel supply port 34.

In the fuel tank 826, at the time of inserting the fuel gun or the like G into the fuel supply port device 840 in the condition where the tank cap 135 is opened, the fuel gun or the like G is inserted obliquely from the upper side on either the left side or the right side of the fuel supply port device 840.

In this case, since the smooth parts 143b are provided on both the left and right sides of the taper part 142b, the tip of the fuel gun or the like G easily makes sliding contact with the flat part 143b, and the fuel gun or the like G can be guided toward the insertion hole 845 smoothly, as compared with the case where the fuel gun or the like G makes sliding contact with the mesh part 143a. In addition, since the mesh parts 143a are provided on the front and rear sides of the taper part 142b, flowability of a fuel can be secured favorably.

When the open-close lid 846 is pushed by the fuel gun or the like G from the upper side, the open-close lid 846 is pushed open downward (in the opening direction) against the biasing force of the helical torsion spring 848, whereby the insertion hole 845 is opened and the fuel gun or the like G can be brought to the inside of the tank body 131. Besides, by only withdrawing the fuel gun or the like G upward from the insertion hole 845, the open-close lid 846 is made to close the insertion hole 845, returning to the initial condition.

In the condition where the insertion hole 845 is closed with the open-close lid 846, an upper surface on the outer circumference side of the open-close lid 846 makes contact with a lower surface of the inner flange part 142c over the whole circumference. This ensures that the insertion hole 845 is closed with the open-close lid 846 in a sealed state.

Figure 16A:
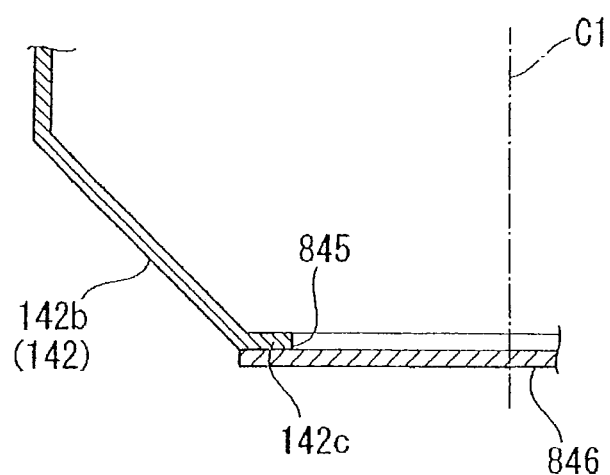
FIG. 16(a) is an enlarged view of a major part of FIG. 14.
Figure 16B:
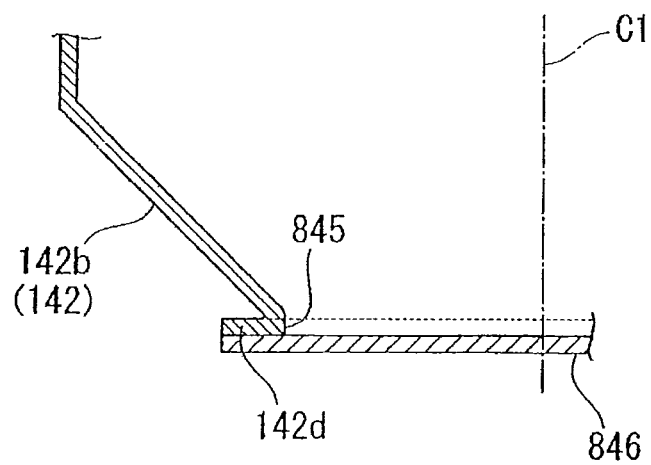
FIG. 16(b) is a sectional view showing a modification of FIG. 16(a).

Here, as shown in FIG. 16(a), the inner flange part 142c is formed by bending the lower end of the taper part 142b to the inner circumference side, but, as shown in FIG. 16(b), the lower end of the taper part 142b may be bent back to the outer circumference side to form an outer flange part 142d substantially orthogonal to the axis line C1, in place of the inner flange part 142c. In this case, at the time of inserting the fuel gun or the like G into the fuel supply port device 840 and pushing open the open-close lid 846, the fuel gun or the like G is not caught on the flange part (flat part), so that the fuel gun or the like G can be guided to the insertion hole 845 more smoothly.

As has been described above, in the fuel tank for vehicle 826 equipped with the fuel supply port device 840 in this embodiment, like in the above-described first embodiment, the fuel supply port device 840 is provided with the insertion hole 845 through which the inside of the fuel supply port device 840 and the inside of the tank body 131 communicate with each other and through which the fuel-extracting tool (hose H) is inserted, and with the open-close lid 846 for opening and closing the insertion hole 845. This configuration ensures that the fuel in the tank body 131 can be extracted by inserting the fuel-extracting tool such as the hose H into the fuel supply port device 840 via the fuel supply port 34. Accordingly, the fuel tank 826 can be prevented from being enlarged in size, and the function of the fuel supply port device 840 equipped with the flame arrester 142 can be obtained in the same manner as before.

In addition, in the fuel tank for vehicle 826, the flame arrester 142 has the cylindrical part 142a which extends vertically and the taper part 142b which is continuous with and on the lower side of the cylindrical part 142a and gradually reduced in diameter toward the lower side, the insertion hole 845 is formed at the lower end of the taper part 142b, and the taper part 142b is provided with the smooth parts 143b which does not have the communication holes 42f for permitting the fuel to flow therethrough. This ensures that the fuel gun or the like G inserted into the fuel supply port device 840 can be guided to the insertion hole 845 by the taper part 142*b*, and the guiding of the fuel gun or the like G can be smoothly carried out by the smooth part 143*b* provided in the taper part 142*b*.

Besides, in the fuel tank for vehicle 826, the tank cap 135 is turnably supported on the periphery of the fuel supply port 34 on either the front side or the rear side thereof so as to open and close the fuel supply port 34, and the smooth parts 143*b* are provided on both the left and right sides of the taper part 142*b*. This ensures that, while the fuel gun or the like G is inserted obliquely from the upper side on either the left side or the right side of the fuel supply port device 840 at the time of inserting the fuel gun or the like G into the fuel supply port device in the condition where the tank cap 135 is opened, the fuel gun or the like G can be smoothly guided to the insertion hole 845, since the smooth parts 143*b* are provided along the inserting directions.

In addition, in the fuel tank for vehicle 826, the open-close lid 846 is supported on the flame arrester 142 in the state of being biased in the direction for closing the insertion hole 845, and the flange part 142*c* or 142*d* for forming a seal relative to the open-close lid 846 is provided at the periphery of the insertion hole 845. This enables easy sealing between the insertion hole 845 and the open-close lid 846.

Besides, where the flange part 142*d* in the fuel tank for vehicle 826 is formed by bending back the lower end of the taper part 142*b* to the outer circumference side, the fuel gun or the like G can be prevented from being caught on the flange part, as contrasted to the case where the flange part 142*c* is formed by being back the lower end of the taper part 142*b* to the inner circumference side.

Incidentally, the present invention is not to be limited to the above-described embodiments. For instance, the configuration according to the present invention is applicable not only to motorcycles but also to three-wheel vehicles (inclusive of vehicles having two front wheels and one rear wheel, as well as vehicles having one front wheel and two rear wheels) or four-wheel vehicles.

Besides, the configurations in the above embodiments are examples of the present invention, and, naturally, various modifications are possible without departure from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A fuel tank for a vehicle comprising:
a tank body; and
a fuel supply port device, comprising:
    a fuel supply port provided at an upper wall of the tank body;
    a flame arrester extending downwardly from the fuel supply port, so as to permit a fuel to flow into the tank body and for discharging air present in the tank body, the flame arrester having a sidewall and a bottom wall extending radially inwardly from an inner surface of the sidewall;
    an insertion hole formed in the bottom wall of the flame arrester through which an inside of the fuel supply port device and an inside of the tank body communicate with each other and through which a tool for extracting the fuel can be inserted;
    an open-close lid for opening and closing the insertion hole; and
    a gun stopper having a first end connected to a first portion of the sidewall of the flame arrester and a second end connected to a second portion of the sidewall of the flame arrester, the first portion of the sidewall facing the second portion of the sidewall,
    wherein a first opening is formed between a first side of the gun stopper and the sidewall of the flame arrester and a second opening is formed between a second side of the gun stopper and the sidewall of the flame arrester, and
    wherein the gun stopper extends continuously between the first end and the second end.

2. The fuel tank for a vehicle according to claim 1, wherein the insertion hole and the open-close lid are provided below the gun stopper.

3. The fuel tank for a vehicle according to claim 2, wherein at least a part of the insertion hole is provided at a position to avoid the gun stopper, as viewed in the axial direction of the fuel supply port.

4. The fuel tank for a vehicle according to claim 1, wherein at least a part of the insertion hole is provided at a position to overlap with the fuel supply port, as viewed in the axial direction of the fuel supply port.

5. The fuel tank for a vehicle according to claim 1, wherein the open-close lid is normally biased by an elastic member in a direction for closing the insertion hole.

6. The fuel tank for a vehicle according to claim 1, wherein the insertion hole is a screw hole, and the open-close lid is a screw member to be screw-engaged with the insertion hole.

7. The fuel tank for a vehicle according to claim 1, wherein the open-close lid is provided with a screw part, and the open-close lid is opened and closed by changing a screw engagement position of an adjusting screw member screw-engaged with the screw part.

8. The fuel tank for a vehicle according to claim 1, wherein the flame arrester comprises:
    a peripheral wall part formed in a cylindrical shape so as to surround the gun stopper over the whole circumference of the gun stopper;
    a cap member for covering a lower opening of the peripheral wall part; and
    communication holes, which are smaller in diameter than the insertion hole and which permit the fuel to flow from the inside of the fuel supply port device into the inside of the tank body, are provided in the peripheral wall part and the cap member.

9. The fuel tank for a vehicle according to claim 8, wherein the insertion hole is the lower opening of the peripheral wall part, and the open-close lid is at least a part of the cap member.

10. A fuel supply port device for a fuel tank for a vehicle, the fuel tank including a tank body, a tank cap, and a flame arrester, said fuel supply port device comprising:
    a sidewall;
    a bottom wall extending radially inwardly from an inner surface of the sidewall;
    a fuel supply port provided at an upper wall of the tank body and a top of the sidewall;
    a gun stopper having a first end connected to a first portion of the sidewall of the flame arrester and a second end connected to a second portion of the sidewall of the flame arrester, the first portion of the sidewall facing the second portion of the sidewall;
    a first opening formed between a first side of the gun stopper and the sidewall of the flame arrester and a second opening formed between a second side of the gun stopper and the sidewall of the flame arrester; and an insertion hole in the bottom wall through which an inside of the fuel supply port device and an inside of the tank body communicate with each other and through which a tool for extracting the fuel can be inserted,
wherein a diameter of the insertion hole is less than half a diameter of the fuel supply port, and
wherein the gun stopper extends continuously between the first end and the second end.

11. The fuel supply port device according to claim 10, wherein the insertion hole is provided below the gun stopper.

12. The fuel supply port device according to claim 11, wherein at least a part of the insertion hole is provided at a position to avoid the gun stopper, as viewed in the axial direction of the fuel supply port.

13. The fuel supply port device according to claim 10, wherein at least a part of the insertion hole is provided at a position to overlap with the fuel supply port, as viewed in the axial direction of the fuel supply port.

14. The fuel supply port device according to claim 10, further comprising an open-close lid for opening and closing the insertion hole.

15. The fuel supply port device according to claim 14, wherein the insertion hole is a screw hole, and the open-close lid is a screw member to be screw-engaged with the insertion hole.

16. A fuel tank for a vehicle comprising:
a tank body;
a fuel supply port provided at an upper wall of the tank body;
a tank cap for closing an opening of the fuel supply port;
a flame arrester extending downwardly from the fuel supply port, so as to permit a fuel to flow into the tank body and for discharging air present in the tank body, the flame arrester having a sidewall;
an insertion hole formed in the bottom wall of the flame arrester through which an inside of the fuel supply port device and an inside of the tank body communicate with each other and through which a tool for extracting the fuel can be inserted; and
a gun stopper above the bottom wall, the gun stopper having a first end connected to a first portion of the sidewall of the flame arrester and a second end connected to a second portion of the sidewall of the flame arrester, the first portion of the sidewall facing the second portion of the sidewall,
wherein a first opening is formed between a first side of the gun stopper and the sidewall of the flame arrester and a second opening is formed between a second side of the gun stopper and the sidewall of the flame arrester, and
wherein the gun stopper extends continuously between the first end and the second end.

17. The fuel supply port device according to claim 14, wherein the open-close lid is normally biased by an elastic member in a direction for closing the insertion hole.

* * * * *